(12) United States Patent
Kaufmann et al.

(10) Patent No.: US 8,769,605 B2
(45) Date of Patent: Jul. 1, 2014

(54) SYSTEM AND METHOD FOR DYNAMICALLY ENFORCING SECURITY POLICIES ON ELECTRONIC FILES

(75) Inventors: Tzach Kaufmann, Yahud (IL); Alon Samia, Tel-Mond (IL)

(73) Assignee: Covertix Ltd., Even-Yehuda (IL)

( * ) Notice: Subject to any disclaimer, the term of this patent is extended or adjusted under 35 U.S.C. 154(b) by 924 days.

(21) Appl. No.: 12/412,399

(22) Filed: Mar. 27, 2009

(65) Prior Publication Data

US 2009/0300712 A1 Dec. 3, 2009

Related U.S. Application Data

(60) Provisional application No. 61/064,797, filed on Mar. 27, 2008, provisional application No. 61/129,829, filed on Jul. 22, 2008.

(51) Int. Cl.
*G06F 17/00* (2006.01)

(52) U.S. Cl.
USPC .............................................................. 726/1

(58) Field of Classification Search
USPC ...................................... 726/1, 4, 17, 27, 30
See application file for complete search history.

(56) References Cited

U.S. PATENT DOCUMENTS

| | | | |
|---|---|---|---|
| 5,715,403 A | 2/1998 | Stefik |
| 5,925,100 A | 7/1999 | Drewry |
| 6,185,681 B1 | 2/2001 | Zizzi |
| 6,247,127 B1 | 6/2001 | Vandergeest |
| 6,249,866 B1 | 6/2001 | Brundrett |
| 6,301,660 B1 | 10/2001 | Benson |
| 6,345,361 B1 | 2/2002 | Jerger |
| 6,381,735 B1 | 4/2002 | Hunt |
| 6,748,388 B1 | 6/2004 | Kasamsetty |
| 6,779,107 B1 | 8/2004 | Yates |
| 6,779,120 B1 | 8/2004 | Valente |
| 6,850,893 B2 | 2/2005 | Lipkin |
| 6,891,953 B1 | 5/2005 | DeMello |
| 6,928,545 B1 | 8/2005 | Litai |
| 6,941,285 B2 | 9/2005 | Sarcanin |
| 6,941,456 B2 | 9/2005 | Wilson |
| 6,957,422 B2 | 10/2005 | Hunt |
| 6,970,849 B1 | 11/2005 | DeMello |
| 6,971,017 B2 | 11/2005 | Stringer |
| 6,981,141 B1 | 12/2005 | Mahne |
| 6,981,262 B1 | 12/2005 | DeMello |
| 6,983,371 B1 | 1/2006 | Hurtado |
| 6,993,651 B2 | 1/2006 | Wray |
| 6,993,662 B2 | 1/2006 | Rubin |
| 6,996,720 B1 | 2/2006 | DeMello |

(Continued)

FOREIGN PATENT DOCUMENTS

| | | |
|---|---|---|
| EP | 1326157 | 7/2003 |
| GB | 2404537 | 2/2005 |

OTHER PUBLICATIONS

Office action for corresponding application UK 0905013.9, mailed on Oct. 27, 2011.

*Primary Examiner* — Beemnet Dada
(74) *Attorney, Agent, or Firm* — Graeser Associates International Inc; Dvorah Graeser

(57) ABSTRACT

A system and method dynamically enforcing security policies on electronic files when the file is used. The system and method preferably delegates the file the ability to protect itself. The file automatically identifies its confidential information and applies them when needed.

16 Claims, 16 Drawing Sheets

(56) References Cited

U.S. PATENT DOCUMENTS

| | | |
|---|---|---|
| 7,013,459 B2 | 3/2006 | Kuch |
| 7,017,189 B1 | 3/2006 | DeMello |
| 7,035,850 B2 | 4/2006 | Arai |
| 7,047,411 B1 | 5/2006 | DeMello |
| 7,058,927 B2 | 6/2006 | Yenne |
| 7,065,745 B2 | 6/2006 | Chan |
| 7,080,043 B2 | 7/2006 | Chase, Jr. |
| 7,083,095 B2 | 8/2006 | Hendrick |
| 7,085,741 B2 | 8/2006 | Lao |
| 7,089,246 B1 | 8/2006 | O'Laughlen |
| 7,089,429 B2 | 8/2006 | Gustafsson |
| 7,093,282 B2 | 8/2006 | Hillhouse |
| 7,096,358 B2 | 8/2006 | Zizzi |
| 7,096,370 B1 | 8/2006 | Klein |
| 7,111,285 B2 | 9/2006 | Smith |
| 7,120,604 B2 | 10/2006 | Maari |
| 7,142,648 B1 | 11/2006 | Miller |
| 7,152,046 B2 | 12/2006 | Wang et al. |
| 7,158,953 B1 | 1/2007 | DeMello |
| 7,165,260 B2 | 1/2007 | Blaser |
| 7,171,692 B1 | 1/2007 | DeMello |
| 7,174,021 B2 | 2/2007 | Krishnaswamy |
| 7,177,843 B2 | 2/2007 | Nguyen et al. |
| 7,178,033 B1 | 2/2007 | Garcia |
| 7,181,472 B2 | 2/2007 | Cameron |
| 7,181,761 B2 | 2/2007 | Davis |
| 7,184,985 B2 | 2/2007 | DeTreville |
| 7,194,477 B1 | 3/2007 | Bradley |
| 7,197,160 B2 | 3/2007 | Rhoads |
| 7,200,869 B1 | 4/2007 | Hacherl |
| 7,206,765 B2 | 4/2007 | Gilliam |
| 7,225,460 B2 | 5/2007 | Barzilai |
| 7,228,437 B2 | 6/2007 | Spagna |
| 7,234,109 B2 | 6/2007 | Atkinson |
| 7,278,165 B2 | 10/2007 | Molaro |
| 7,284,263 B2 | 10/2007 | Davis |
| 7,287,140 B1 | 10/2007 | Asanovic |
| 7,290,266 B2 | 10/2007 | Gladstone et al. |
| 7,290,275 B2 | 10/2007 | Baudoin |
| 7,290,285 B2 | 10/2007 | McCurdy |
| 7,298,851 B1 | 11/2007 | Hendricks |
| 7,299,171 B2 | 11/2007 | Ta |
| 7,308,388 B2 | 12/2007 | Beverina |
| 7,308,573 B2 | 12/2007 | Kostal |
| 7,308,684 B2 | 12/2007 | Chan |
| 7,308,717 B2 | 12/2007 | Koved |
| 7,313,822 B2 | 12/2007 | Ben-Itzhak |
| 7,313,824 B1 | 12/2007 | Bala |
| 7,316,032 B2 | 1/2008 | Tayebi |
| 7,318,236 B2 | 1/2008 | DeMello |
| 7,320,140 B1 | 1/2008 | Boyer |
| 7,331,063 B2 | 2/2008 | Gunyakti |
| 7,437,752 B2 * | 10/2008 | Heard et al. ............... 726/1 |
| 7,526,792 B2 * | 4/2009 | Ross ......................... 726/2 |
| 7,546,629 B2 * | 6/2009 | Albert et al. ............... 726/1 |
| 7,647,622 B1 * | 1/2010 | Sobel et al. ................ 726/1 |
| 7,657,924 B2 * | 2/2010 | Hondo et al. .............. 726/1 |
| 8,056,139 B2 * | 11/2011 | Witt et al. ................. 726/26 |
| 8,201,244 B2 * | 6/2012 | Sun et al. .................. 726/22 |
| 8,302,178 B2 * | 10/2012 | Camiel ...................... 726/11 |
| 2001/0044901 A1 | 11/2001 | Grawrock |
| 2003/0182475 A1 | 9/2003 | Gimenez |
| 2007/0143851 A1 * | 6/2007 | Nicodemus et al. ....... 726/25 |
| 2007/0192864 A1 | 8/2007 | Bryant |
| 2008/0301757 A1 * | 12/2008 | Demarest et al. .......... 726/1 |
| 2009/0144545 A1 * | 6/2009 | Dhuvur et al. ............. 713/165 |
| 2009/0300712 A1 | 12/2009 | Kaufmann |
| 2011/0209193 A1 * | 8/2011 | Kennedy .................... 726/1 |
| 2011/0209196 A1 * | 8/2011 | Kennedy .................... 726/1 |

* cited by examiner

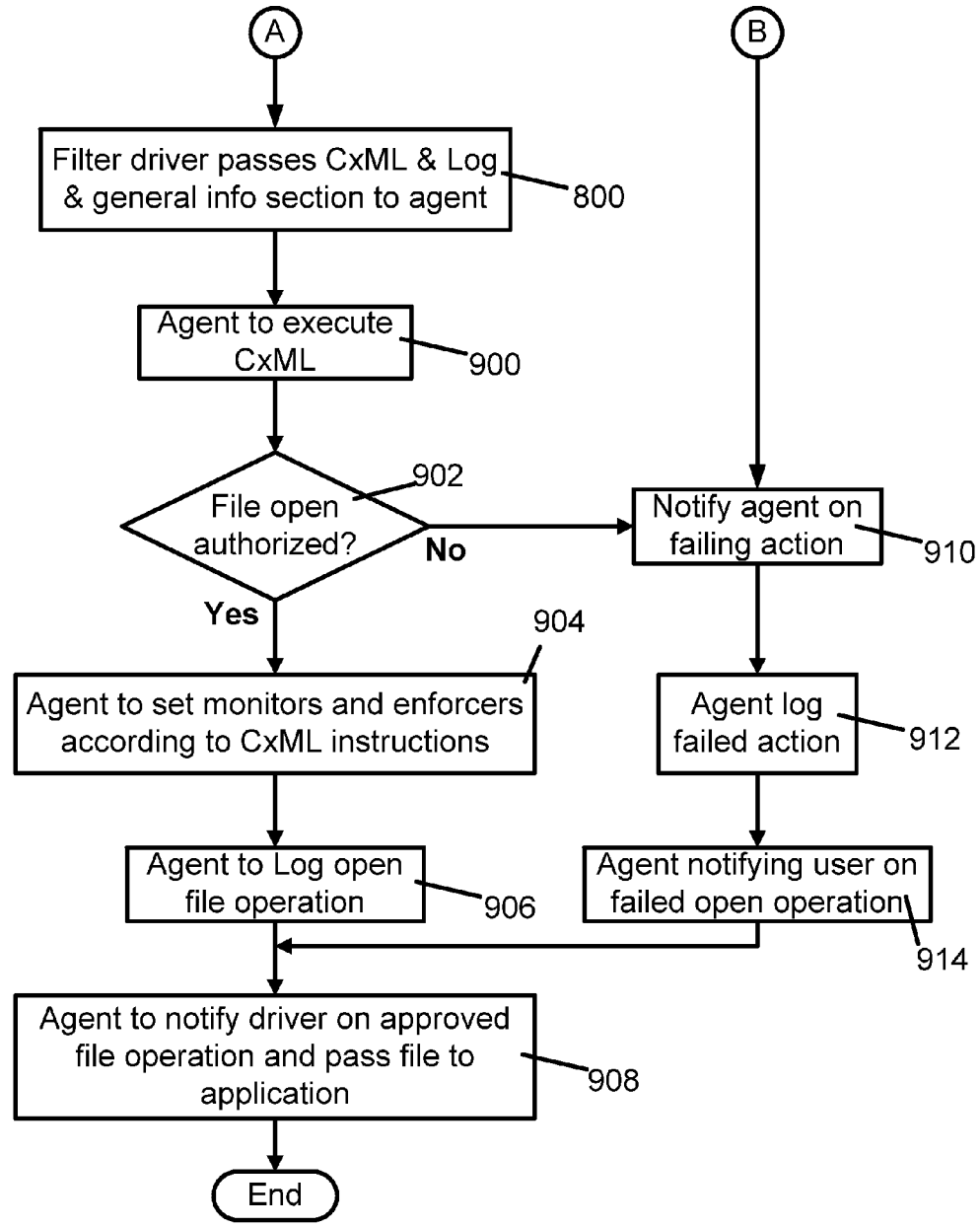

SYSTEM AND METHOD FOR DYNAMICALLY ENFORCING SECURITY POLICIES ON ELECTRONIC FILES

This application claims priority from U.S. Provisional Application No. 61/064,797, filed on Mar. 27, 2008, and U.S. Provisional Application No. 61/129,829, filed on Jul. 22, 2008, both of which are hereby incorporated by reference as if fully set forth herein.

FIELD OF THE INVENTION

The present invention relates generally to control of electronic files technology and in particular to enforcing policies on electronic files.

BACKGROUND OF THE INVENTION

The term DRM, or digital rights management, refers to access control technologies used to limit usage of digital media. Digital rights management technologies attempt to control use of digital media by preventing access, copying or conversion by end users to other formats, among the various types of control. Digital media files may be duplicated an unlimited number of times with no degradation in the quality of subsequent copies and, thus need special protection. The protection of digital media is important for many reasons, for example for maintaining the confidentiality of company professional secrets especially when working with partners and also for protecting the privacy of personal information that is kept in organizations such as banks etc.

At present, a majority of security systems are based on authentication and authorization methods which are focused on ensuring access to a given system, using schemas of username and password, smart cards or physical device identifiers. Such systems do not take into consideration parameters such as the physical location of the device or the content of the information, etc. Current systems also save the policy for accessing the files in a central server or in a specific device, limiting the usage of the rules to the specific device or a specific network. Unfortunately these systems do not provide protection when electronic data is transferred to another device.

Other systems hold the policy with the file. One example of such a system is Microsoft Windows Rights Management Services (also called Rights Management Services or RMS). RMS provides the encryption of information, and through server-based policies, prevents the protected content from being decrypted, except by specified people or groups. This system controls limited number of operations like printing, copying, editing, forwarding, and deleting. Unfortunately RMS is limited in many ways such as reliance on user set-up, no separation of duties and fixed rather than dynamic policy structure.

The limitations described above do not provide a solution to the problem of information leakage by authorized users such as employees, partners, vendors, customers etc, nor do they provide an easy and transparent solution for sharing data between organizations without losing the security policy that is enforced on the data, nor does it provide any solution to the identification and tracking of key information.

SUMMARY OF THE INVENTION

The background art does not teach or suggest a system and method for protecting files anywhere and anytime. The background art also does not teach or suggest such a system and method which is able to provide reports about action taken on a file anytime and anywhere. The background art also does not teach or suggest such a system and method in which control of a file is provided through one or more policies and/or actions taken at the file itself.

The present invention overcomes these deficiencies of the background art by providing a system and method for dynamically checking and preferably also dynamically and flexibly enforcing policies independently at the file itself, such that optionally and preferably such a policy may be enforced even if the file is not in contact with an external server. The policy itself is also preferably dynamic in nature.

According to preferred embodiments of the present invention, the system and method preferably delegates the ability to check a policy, and more preferably also to enforce the policy, to the file itself. The file preferably automatically identifies its contents and context, and applies the appropriate policy, more preferably dynamically and flexibly enforcing the policy. For example, the policy may optionally be applied and enforced to enforce access and usage rights of the information held by this file. Preferably, the file and policy are co-maintained independently, without reference to an external entity, such that the policy is maintained and more preferably enforced even if the file is lost, stolen or moved from its secure place. Such co-maintenance permits the organization to share data resources with other organizations while maintaining the same level and type of policy enforcement as if these data resources were located within the organization boundaries (whether physical or electronic) and/or control.

A default policy is optionally applied to the file to maintain at least a baseline type of policy implementation for an organization, for example optionally related to access control and/or storage and/or movement of the file, even if the file later leaves the control of the organization, for example by being physically moved and/or electronically transferred.

According to other preferred embodiments of the present invention, the delegation of the policy to the file further comprises the ability to monitor and log the authorized and non-authorized activities that are performed on and/or with and/or to this file, and to report the log to a server and/or other external entity. Optionally and preferably, the file may also issue an alarm or perform another action according to the policy, such that enforcement may optionally comprise a positive action and/or a negative action. By "negative action" it is meant, for example, simply blocking an attempted action by the file if such an attempted action is not permitted by the policy.

According to other preferred embodiments of the present invention, the policy is automatically (and optionally and preferably covertly) applied to the file without the need for user interference or other manual action; more preferably, the user is not aware of such a policy, although optionally (additionally or alternatively) the user manually requests and/or adjusts the policy.

According to other preferred embodiments of the present invention, the policy is optionally classified according to a group of users, for example within an organization, such as a department (financial, human resources) and/or users having a given level or type or responsibility and so forth.

According to other preferred embodiments of the present invention, the system and method preferably provides a business-rules engine for defining one or more policies. Optionally and more preferably, polices are defined according to one or more business rules as applied to one or more file parameters, including but not limited to, content, context, location, or users, or a combination thereof.

According to other preferred embodiments of the present invention, the system and method preferably provide a policy that is content aware, by optionally limiting/allowing access and/or providing other types of control, based on the digital data content. The determination of the content and hence of the correct policy is optionally based on an analysis performed with a dictionary of words, regular expression rules and key words for blocking/allowing an operation on a file. Thus, policy can change dynamically based on the information entered into a document.

According to other preferred embodiments of the present invention, each policy can optionally be combined with one or more other policies to provide a more complex set of behaviors. For example print handling may optionally be coupled with date/time handling to limit printing to a specific printer and/or to block printing completely until a specific date.

Examples of policies that are supported by the present invention, in at least some embodiments, include but are not limited to:

Automatically allowing for read only access when the file is outside the corporate firewall and allowing full access only if the file is on an authorized network. Another example is when removing protection of a document after predefined time. Such protection can be, for example, protecting from opening the file or protection from deleting a file. For example if, at a certain date the file should become public, the protection limiting viewing of the file can optionally be removed automatically after that date. Another example occurs if, for a certain period, the file cannot be deleted, because of legal issues for example. This protection can optionally be removed when this period is elapsed.

Dynamic policy setting allowing, for example, restriction based on location, specific directory, network or domain.

Building dynamic, business rules based policies, such as allowing printing only to a certain printer, but only on certain days.

Supporting content awareness—for example updating the policy when the document is updated with customer information or financial information.

Providing advanced reporting features such as aggregation of risk reporting, no tracking while in offline mode, or alerting capabilities.

According to other preferred embodiments of the present invention, the system and method preferably provide risk analysis, for example by enabling the administrator to view log files that are collected by the logging and auditing server from all agents into a repository. Agents and/or even policy from individual files are preferably required to log certain types of data, for example regarding authorized and/or unauthorized actions. Such data may then optionally and preferably be analyzed and audited, for example by a third party analysis tool. Risk analysis may also optionally include determining a score, ranking or other quantifiable and/or qualifiable metric related to the amount of risk.

According to other preferred embodiments of the present invention, the policy can optionally control the number of times the file is used (for example: printed, opened). Control is preferably managed and implemented through the policy of the file (ie locally) and not via a centralized server which eliminates the need for communicating with a server. The system according to this embodiment can optionally control the access to the file even if it is copied by updating the policy of both the original and the copied file. For example, if a file that can be opened up to four times is copied, the new copy can optionally be opened only once and the source copy can optionally be opened only three times, such that the total number of times any instance of the file is opened is equal to the number of times that the original file was permitted to be opened. This is preferably and optionally implemented by updating a counter each time the file is opened or copied. If the file is copied the counter in each copy is preferably updated according to the rule which is defined in the policy. The rule can be for example, dividing the permitted time the file can be opened into two. This feature can optionally be used when charging fees based on the time or number of times the file is opened.

According to other preferred embodiments of the present invention, the system and method prevents the circumventing of copying the file without the agent. When a file is copied, the policy optionally and preferably, adds a signature which is based on the time of the action to the copied file. Before opening the file the policy preferably compares the signature to the last update time for the file or to the creation date. If the file was duplicated without an agent, the signature is not valid and the policy preferably prevents the opening of the file.

According to other embodiments of the present invention, the system supports concurrent licensing and usage for files, for example, by updating a central management server every time a file is in use. Furthermore, the system preferably controls the access and concurrent usage at the file level (ie local level) and not at the server level, hence it doesn't matter if the file is duplicated or not. The architecture is also simpler; the management server doesn't need to keep track of usage of every file with a license, but rather only of the currently opened instance; the management is delegated to the file through the policy.

According to other embodiment of the present invention, the policy may optionally limit the access and usage based on various system attributes such as specific networks which can optionally be identified by IP address and/or MAC address, specific hosts or shared drives. For example, the policy can optionally open the file only if the source of the file is a specific fileshare in a datacenter such as NAS (a NAS unit is a self-contained computer connected to a network, with the sole purpose of supplying file-based data storage services to other devices on the network). This embodiment preferably prevents the leakage of the file.

According to other embodiments of the present invention the system and method can optionally provide a multifactor authentication at the file level, regardless of the system the file is on. The method is optionally and preferably implemented by embedding the authentication in the file's policy. An authentication factor is a piece of information and process used to authenticate or verify a person's identity for security purposes. Multifactor authentication uses more than one factor for delivering a higher level of authentication assurance. The user is authenticated by providing more than one factor. Such factors can optionally be, for example, any type of data which is likely to be known only to the user, including but not limited to user password, private details about the user, such as the elementary school the user went to, mother's maiden name, a fingerprint smart card details or dongle. (the policy can optionally request to authenticate by a dongle).

According to other embodiments of the present invention the system and method can optionally provide a multifactor system authentication at the file level which is transparent to the user. Such authentication can be, for example, by asking for network parameters such as IP or device parameters such as MAC address and the like.

According to other embodiments of the present invention the policy can optionally enable the changing of the file protection based on condition such as elapsing of time, changing of ownership. These conditions optionally and preferably are identified by rules in the policy which can, for example, indicate an event such as the publication of a certain financial document and the like.

According to other embodiments of the present invention the policy can optionally be customized to enable the enterprise to define its own needs. This customization can optionally be done by the operator, using, for example, a design tool, or any other method supported by the invention. This embodiment is preferably and optionally implemented by enabling the enterprise to define custom fields in the policy that can be dynamically changed based on organization preset conditions. For example an organization can optionally create a custom field that is needed to restrict access to sales person based on some predefined criteria. This field creates a value and/or function that is determined by the organization and is changed once the condition has been met and thus can restrict access. Another example is the option for adding new authentication methods to the policy which can optionally be unique for a certain enterprise.

According to other preferred embodiments of the present invention, the system and method preferably support performance of a learning phase in which the administrator can monitor the file behavior in order to determine whether and/or how to apply policy rules and hence polices. The learning phase is optionally performed in order to understand data movements and/or actions inside and/or outside of the organization, preferably at least initially without enforcing a policy on the files. The provided functionality is dedicated for the learning phase and, thus, preferably does not feature protecting functionality; optionally one or more other features of the fully enabled protective application may not be present as well.

This simulation process may optionally be used to send notifications to users who are violating company security regulations. This phase is also helpful for identifying possible policy conflicts. To help ease this problem, the learning policy phase also optionally collects information on policy change decisions made throughout the usage of inspected data files, preferably at least with regard to resolving policy conflicts. During this phase the report server optionally receives as input all the data collected from various files and, using a logic simulation, simulates the enforcement of the requested policies on the collected data. It then optionally generates a list of potential violations that can be analyzed by the administrator, in order to understand what would have happened if this policy was activated.

According to other preferred embodiments of the present invention, the system optionally provides risk score information at different level and across different dimensions; for example, by locating all the files that are scored by the system with a value greater than a certain threshold, or determining the score factor for a given laptop, or identifying the ten most important (in terms of information risk) locations or laptops for the organization. A risk score is optionally calculated for a data file regardless of its policy. In order to assign risk factors, dictionaries are preferably defined for content analysis. These are also optionally and more preferably the same dictionaries that can be used to associate a policy to a given data object. The score calculation is optionally based on comparing all dictionary rules for selected dictionaries against the file's content. Risk scoring method can optionally be applied on any data object including, but not limited, data files, PST files etc. Also optionally, files may be assigned a risk score automatically according to one or more non-content based parameters (for example according to the group originating the file, printing frequency outside the organization, locations of files) and/or manually.

According to other embodiments of the present invention, the policy may optionally limit the access and usage based on the physical location of the file. The policy can optionally identify the location of the device on which the file is installed by, for example, interfacing with a GPS system that is installed on that device, or by interfacing with mobile phone location service, in the cases that the file resides on mobile phone, or by using special transmitters limiting access to the physical range of the signal transmitters such as RF transmitters. It should be understood that these examples for determining the location of the file are given for the purpose of illustration only and that other implementations are contemplated within the scope of the present invention.

According to other embodiments of the present invention, the agent optionally and preferably holds a private key that can decrypt the SDW encrypting symmetric key. The agent can use this symmetric key for decrypting the SDW and optionally but not necessarily for decrypting the data file. The number of encrypted symmetric keys that are added to an SDW depends on the number of target users (AU users/groups) and the key pair distribution method. According to this embodiment, either using a single key pair for internal organization usage can be supported or key pair per user/group. In either case external users, for example those users that reside outside of the firewall or other computer security measures, and are not defined in the organization's Active Directory (customers, suppliers, joint venture members), would use public keys that are unique to their agent and not to the user. This embodiment is called mode 1.

According to other embodiments of the present invention, the system and method address the problem that may occur as a result of too many encrypted symmetric keys added to the SDW. Adding many encrypted symmetric keys can create a large file even with a small amount of data. According to this mode, only a single encrypted symmetric key is added to an SDW (with the exception of external users who are authenticated through their agent, for whom a key per agent is still used). When the SDW needs decryption, the agent preferably transfers the encrypted symmetric key with the CxML and current logged in user credentials to the Cx-Server. The Cx-server preferably decides, based on the received information, if the user can consume the file. If so, then the server returns a user key pair encrypted with the agent self usage key to the agent, as well as the symmetric key encrypted with the enclosed public key. This embodiment is called mode 2.

According to other embodiment of the present invention, the agent is able to transfer from mode 1 to mode 2 and vice versa, in order to better suits a different environment. For example mode 2 is preferred for an instance in which each user has it's own unique key and all files reside inside the enterprise. Mode 1 is preferred for an instance in which most (if not all) files are sent outside of the enterprise.

The switching from mode to mode is preferably set by the Cx Administrator.

As described herein, the term "file" may optionally refer to any data, data object, and collection of data, data entities, emails and the like. As described herein, the term "folder" may optionally refer to a source of file which can optionally be sharepoint repository, application, file management system and the like.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or stages manually, automatically, or a combination thereof. Moreover, according to actual instrumentation and equipment of preferred embodiments of the method and system of the present invention, several selected stages could be implemented by hardware or by software on any operating system of any firmware or a combination thereof. For example, as hardware, selected stages of the invention could be implemented as a chip or a circuit. As software, selected stages of the invention could be implemented as a plurality of software instructions being executed by a computer using any suitable operating system. In any case, selected stages of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION

Figure 1:
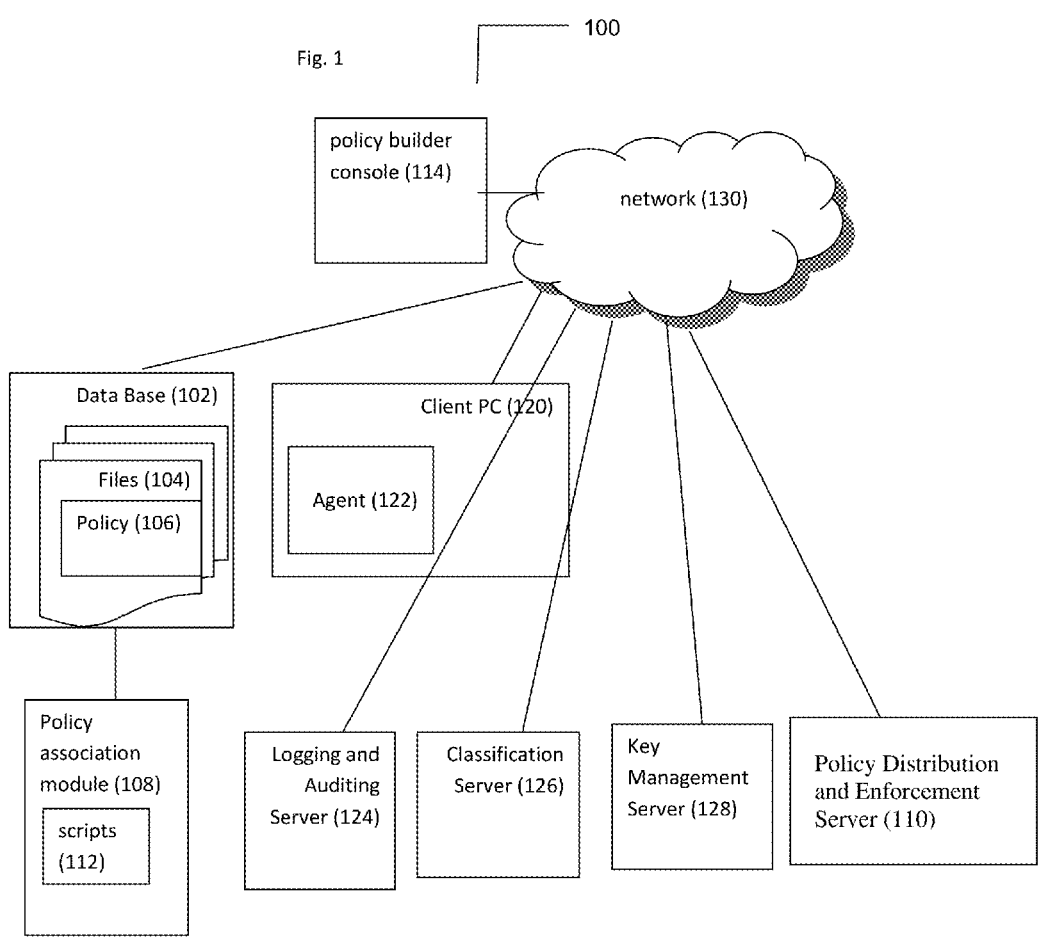
FIG. 1 is a schematic block diagram of an illustrative system according to some embodiments of the present invention.

The present invention is of a system and method dynamically enforcing policies on electronic files when the file is accessed and/or moved and/or copied and/or any other interaction. The system and method preferably delegates the file the ability to protect itself. The file preferably automatically identifies the policy and more preferably automatically enforces the policy as required. Optionally and more preferably, enforcement is performed through a framework, such as an agent for example, which is optionally and most preferably installed on a computer or other device hosting and/or interacting with the file.

Optionally and preferably, the policy enables the owner of a file (or its contents thereof), such as an organization, to maintain a domain of data control, even if the actual file is not within the actual direct control of the organization, for example optionally by being outside of the physical and/or electronic boundaries of the organization. A policy for the domain of data control may optionally and preferably include but is not limited to one or more of access control, location control and status control.

Status control preferably relates to any time delimited or changeable aspect of the status of a file. Status control optionally and preferably includes but is not limited to one or more of required to store, required to delete, required to block some or all or specific access to the file, required to permit some or all or specific access to the file, and the like. The status may optionally be automatically changed over time, such that a policy may first specify that a file is required to be stored for a certain period of time, after which the file may optionally be required to be deleted after that period of time has elapsed. Access to certain information may optionally be blocked and/or permitted for all, some or specific users in a manner which is also changeable over time; for example, the policy may optionally specify that less or more stringent access is permitted initially, after which access may optionally be broadened.

Another non-limiting example of status control may optionally include permitting a file (or a particular file instance) to only be accessible and/or available for interactions at one location (and/or a specified number of locations) at one time (ie concurrently). For example, if the file comprises a song (music file), then optionally multiple copies of the file may be distributed, but only one or limited number of instances of the file could be accessed at any one time so as to prevent illegal sharing of music. For this embodiment, the agent is preferably required to communicate with some type of monitoring server, for reporting the number of current opened files.

According to another preferred embodiment of the present invention, the files and/or contents thereof may optionally and preferably be logged, and any actions (authorized or unauthorized) may also optionally and preferably be logged. For example, if the agent attempts to contact a server but is not able to contact it, then such an action and lack of response is also preferably logged, more preferably associated with the file.

According to some embodiments, one or more aspects of a policy according to the present invention are preferably constructed in CxML (Covertix Management Language), which is a scripting language and is more preferably a textual, interpreter based programming language.

CxML provides various functionalities embedded within its grammar that enables the administrator to customize the behavior of and/or interactions with and/or actions performed upon files according to any business process. The CxML may optionally be implemented as an open, extensible language.

As an interpreted language, CxML is dependant upon a parser to execute its functions. Therefore, any parsers (such as those preferably contained in agents for example) preferably determine whether the version of the parser is suitable for the version of CxML before attempting to parse the instructions.

The CxML scripts are preferably held in a single textual file. This file is divided into several sections with each section responsible for a different aspect of the CxML action. Each CxML file is called a "CxML policy" and receives its own unique ID and version. The ID preferably does not change; any changes are preferably indicated through version indications.

The following is a list of sections included within the CxML file:

Preprocessing. This section is holds a list of parameters responsible for handling all the administration tasks that should occur before the CxML is actually executed. Examples of such parameters include but are not limited to the CxML policy version, minimum required CxML parser version, check if new CxML version exists etc.

Global. This section is a list of static parameters, responsible for defining global attributes that shall be used later on by the CxML when executed. The parameters may optionally be changed. Examples of such parameters include but are not limited to the Policy phase, if grace period enabled etc.

Assign. This section is a list of parameters that are used to hold values that will change during the course of the CxML execution. Such parameters might be the number of times that a file was opened or any parameter for temporary usage.

States and Conditions. This CxML section holds the CxML code that is responsible for letting the administrator do specific security actions (like block file open) depending on various environmental conditions. The states and conditions receive their input from the Cx-Sense system monitors (Cx-Sense monitors are operating system functionality that provides information on user, network, domain etc. For example a monitor might provide information on the name of the current logged on user, or the network to which the current host is connected) and from the global and assign sections of the CxML.

The states and conditions then return values based on the specific action required by the selected state or condition. For example a state might be an enquiry on the location of the host that opened the file, whether inside or outside of an organization, physically and/or electronically.

The difference between states and conditions is that states may return a value (number, string etc.). A condition always returns a Boolean value, True or False.

Actions. This section is a collection of CxML functions, each handling different aspect of file usage. For instance there may optionally be an action for file deletion, an action for saving a file, for printing a file etc. Inside the action, the administrator can set a set of rules (with logic operations like if, And, OR etc.) that are a group of states and conditions and what needs to be done when these states and conditions match some criteria. For example an action might state that printing a certain file is only permitted inside the office. If a user opens this file outside of the office and tries to print, the print action is preferably blocked.

Main. This CxML section is a collection of CxML syntax that invoke a CxML Action when the user actually performed something. For example, when the user copies a file, the Copy option in the CxML main section is triggered and then the CxML Open Action is preferably executed. This section provides great flexibility as to use different actions for different file usages in different phases of the CxML policy. These phases optionally include but are not limited to one or more of discovery, policy testing and policy association, as described in greater detail below.

FIG. 1 is a schematic drawing of an exemplary, illustrative system according to the present invention. As shown, a system 100 comprises a database 102 which features a plurality of files 104. It should be understood that database 102 is only one example of a repository for files 104 and that files 104 may optionally be maintained at any suitable location. Each file 104 preferably features a policy 106, which optionally and preferably enables the owner of each file 104 (or its contents thereof), such as an organization, to maintain a domain of content control, even if the actual file 104 is not within the actual direct control of the organization, for example optionally by being outside of the physical and/or electronic boundaries of the organization. Policy 106 preferably enables the domain of content control to be provided and preferably also comprises a set of business logic parameters and an interpreter script, which is optionally and most preferably in the Covertix Management Language (CxML). Policy 106 may optionally and preferably include but is not limited to one or more of access control, location control and status control.

Although policy 106 is optionally static, according to other embodiments of the present invention, policy 106 may optionally be changed dynamically at run-time. The usual policy type that is specified is a static type, meaning that all parameters were pre-defined during the policy creation and attachment to a point of association. However, there are special cases in which some of the policy parameters and optionally also the point of association itself needs to be determined at run time, for example according to information provided by a computer or other access device currently storing or holding file 104. This type of policy is called a "Run Time Updatable Policy" and is described in greater detail below.

Another example of the Run Time Updatable Policy is file protection with active folder groups dynamically updated per the origin folder from which this file originated. Each group preferably has one or more business logic rules or other parameters defined, for example for automatic application of policy 106. Each file 104 placed in the origin folder of the group thus automatically receives the respective policy 106. If policy 106 is applied dynamically, then even if one or more business logic rules and/or parameters are changed, i.e a new user is added, then the changes may preferably be propagated dynamically.

Policy 106 is preferably applied, more preferably automatically, by a policy association module 108. Policy association module 108 preferably receives policy 106 and/or one or more components thereof from a policy distribution and enforcement server 110. Policy association module 108 then causes policy 106 to be applied to file 104, preferably through an SDW (secure data wrapper). The SDW is the digital capsule in which the original data of file 104 is placed. The policy 106 is also placed inside the SDW. The SDW optionally also contains information as to the usage of file 104 throughout its life cycle and other service attributes that maintain integrity between file 104 and any relevant scripts which are present in policy 106. Any script(s) present as part of policy 106 preferably interact with the SDW.

The exact structure of the SDW is shown in more detail in FIG. 2 below.

Policy association module 108 preferably comprises one or more scripts 112 for applying policy 106 to the appropriate file(s) 104. Script(s) 112 are capable of generating the SDW for the file(s) 104 that require protection. The scripts 112 are transferred to the file 104 whenever the file 104 is generated and preferably also whenever there are changes in conditions and/or change in policy 106, such as a new user for example, which may optionally include re-generating the SDW. The CxML is optionally activated whenever the file 104 is about to be accessed and/or copied and/or moved or otherwise interacted with. It validates the action according to the policy 106, optionally logs a message and if an action is not validated, optionally generates alarm.

Policy 106 can optionally enforce rules, for example, on registry handling, rules based on time, network location, file content or the application. For example the policy can set rules for enforcing/allowing a certain application to access a specific content in a specific time. A policy 106 can optionally be combined of one or more atomic policies. For example print handling may optionally and preferably be coupled with date/time handling to limit printing to a specific printer and/or to block printing altogether, optionally and more preferably up to a specific expiration date.

Policy 106 can optionally be applied on a file attached to an email. In this case the policy can be used, for example, for blocking e-mail of digital content, blocking e-mail forwarding operation, encapsulating the e-mail body into an SDW and attaching it as a file to new e-mail, if confidential content is found. Policy 106 can optionally be applied for IM (instant messaging) for example by encapsulating the IM body content (ie the content of the instant message) into an SDW and attaching it as a file to a new such message, if confidential content is found. Other types of messaging systems and protocols may optionally be similarly handled.

Policy 106 can optionally limit the actions of a web browser on digital data, for example by blocking access to the file by the web browser.

Policies 106 are preferably built for distribution by a policy builder console 114, which more preferably features an application for generating the policies 106. Policy builder console 114 may optionally generate polices 106 automatically, for example according to a set of business rules; optionally, alternatively or additionally, one or more policies 106 may optionally be constructed manually, as described in greater detail below. The basic mode of the policy builder GUI (graphical user interface) offers a straightforward approach with few options available to the administrative user—maintain policy, priority system and user input- and limited flexibility, while advanced may optionally offer maximum flexibility that will require longer administration.

System 100 also preferably features a client computer 120 with an agent 122. There are optionally one or more agents 122 in a system; preferably, each client computer with which a user may interact features such an agent 122. Each agent 122 is preferably passive. For example, agent 122 may optionally interpret one or more portions of the SDW of a file 104, but preferably only does so if such a file 104 is presented, for example if access to file 104 is attempted through client computer 120 on which agent 122 resides. In that sense, agent 122 may be considered to be an execution platform, operating according to the rules extracted from this SDW. Thus, control over each file 104 is maintained autonomously by file 104; furthermore, each agent 122 may interact with any file 104 presented without requiring a connection to an external entity, such as an external server, to operate. Such a lack of a requirement for an external connection also means that agent 122 does not need such an external connection to obtain instructions. The external connection is required if the policy 106 changes, for updating for example; however, file 104 is still autonomous.

Agent 122 preferably performs one or more of the following actions: enforcing any overall aspects of policy as outlined by the system administration, making classification decisions, optionally encryption/decryption of the entire SDW and/or of portions thereof, and also acting as code interpreter for SDW Covertix Management Language (CxML).

According to preferred embodiments, agent 122 may also optionally store Local Dictionaries, for example for content analysis and/or validation. As agent 122 performs content analysis for a certain file 104 based upon the rules that appear inside the CxML, it may become necessary to store local copies of the various Dictionaries on the agent 122. The local storage will provide means of offline text analysis.

Agent 122 may also optionally and preferably be instructed to verify policy 106 for each file 104 stored locally at client computer 120, for example under instruction from policy distribution and enforcement server 110.

Agent 122 may also feature one or more Read Only Monitors, to enforce the read only property for a specific file 104, which means that a user can't save any changes done to the file 104. Agent 122 may also preferably be able to provide delete protection, which is the ability to prevent the intentional deletion of one or more files 104.

Agent 122 preferably also includes one or more Registry Monitors, in order to be able to identify an attempt to change settings in the operating system registry of client computer 120, for example in order to "hack" client computer 120 and/or system 100.

Agent 122 preferably also includes an Offline/Online Monitor, since policy 106 may optionally be set based on the location of the digital data file 104. A host machine that is online may optionally be using a less restricted policy than a host machine that is offline.

Agent 122 preferably also includes content monitoring, which is the ability to determine the correct policy for a digital data file 104 based upon its content.

Agent 122 optionally provides information to the user regarding the connectivity with policy distribution and enforcement server 110.

Agent 122 optionally logs the status of its current state, which may optionally include but is not limited to the following states: synchronizing with policy distribution and enforcement server 110, idle, analyzing content, etc (see below for a description of handling of such logs).

Agent 122 is preferably required to be present and functioning for interactions with file 104 in order for one or more, and preferably any, interactions between file 104 and an external application or device to occur. More preferably, agent 122 is required for even basic access to file 104, for example by encrypting/decrypting file 104, but is preferably also required for analyzing and classifying the content of file 104, and/or analyzing policy 106 and enforcing it on the file 104. Depending upon the policy 106, the agent 122 optionally checks the following criteria before allowing access to file 104, for example before allowing a user to open file 104: the authorization of the user with regard to this file 104; the authorization of the group to which the user belongs with regard to this file 104; the expiration date for access to the file 104 and/or the initial date of access to the file 104; whether a particular client computer 120 is permitted to access the file, for example according to the identity of the computer 120 itself, its domain (such as an NT domain for example), the physical location of computer 120, the network (or electronic) location of computer 120 and so forth; whether agent 122 is authorized to access the file 104; whether the hash values match for policy, data and their matching rules; and so forth.

As a result, for example, the behavior of file 104 may optionally and preferably change depending upon the environment, for example whether file 104 is within the electronic and/or physical boundaries of the organization. Once outside such boundaries, optionally actions performed upon and/or interactions with file 104 are restricted, such that the behavior of file 104 is restricted.

Agent 122 preferably also includes protection from authorized users, for example by enforcing rules so as to prevent the authorized user from making mistakes or deliberately take confidential material from the organization.

Agent 122 optionally generates a warning notification and status alerts in order to provide the user feedback on operations, violations and general information on the system 100. The alerts are optionally supported for any file, e-mail, browser and other applications that handle digital content. The alerts are optionally generated upon any action performed by the user that violated the policy, any action that is marked in the policy as "Needing User Attention" and/or user input and any action, performed by the agent 122, that requires a notification and/or warning to be given to the user. An alert can optionally be any of the following types: Alert display, for example a visual display on the screen of the computer being used; an alert sound or other display; or a Message Box—A message box is optionally opened and provides information. This will require user interactions; it may also optionally be used to determine whether a user may overrule a policy and if so, to request whether the user wishes to overrule the policy.

Agents 122 preferably communicate with a logging and auditing server 124, which is responsible for collecting data from all agents 122 into a repository. As previously described, agents 122 and/or even policy 106 from individual files 104 are preferably required to log certain types of data, for example regarding authorized and/or unauthorized actions. Such data may then optionally and preferably be analyzed and audited, for example by a third party analysis tool (not shown) and/or by logging and auditing server 124.

System 100 preferably also includes a classification server 126 for classifying the content of files 104, thereby enabling one or more parameter(s) of policy 106 to be determined according to analysis of such content. Optionally and preferably (additionally or alternatively), agent 122 performs classification of the content of the file(s) 104 hosted by that agent 122. Content analysis may optionally include one or more of dictionary-based analysis, type of user permitted to access the content (more preferably according to a user permission profile that is built from a plurality of smaller building blocks), whether specific types of data and/or images and/or audio and/or video and/or other content are present and so forth. The content itself may optionally be analyzed according to cluster based analysis, natural language and/or other types of "human meaning" analysis methods for understanding content. When the agent 122 is not connected to a classification server 126, agent 122 may optionally operate "offline", optionally with limited functionality; alternatively and optionally, agent 122 may not operate at all. In this case the agent 122 may optionally be restricted as to the number of times a file 104 can be opened while in offline mode or the number of days a file 104 is opened while in offline mode, or use any other restriction.

According to some embodiments, access to a file 104 requires decryption of the contents, such that files 104 are preferably normally maintained in an encrypted state. Agents 122 each optionally verify with key management server 128 as to whether if keys per user or group of users exist, and if not, each agent 122 creates its own keys and optionally send the public key to a key management server 128, which is optionally responsible for distributing such public encryption/decryption keys to agents 122 and/or to other entities in system 100, in order to permit access to one or more files 104.

Alternatively, key management server 128 is optionally responsible for distributing all such encryption/decryption keys to agents 122 and/or to other entities in system 100, in order to permit access to one or more files 104. Alternatively, an external encryption/decryption system may optionally be used instead, such as RMS for example.

Communication between all system components is preferably performed through a network 130 as shown, such as a computer network for example, which may optionally comprise a plurality of different types of networks, optionally also including the Internet for example. Communication data is optionally encrypted.

Agent 122 may optionally be installed as an executable for wrapping around the file 104 for being transferred to a user computer or other device that is to host or otherwise interact with the file 104. Additionally or alternatively, agent 122 may optionally be provided as freeware or other distributed software in order to permit files 104 to interact with agent 122 outside of system 100.

Figure 2:
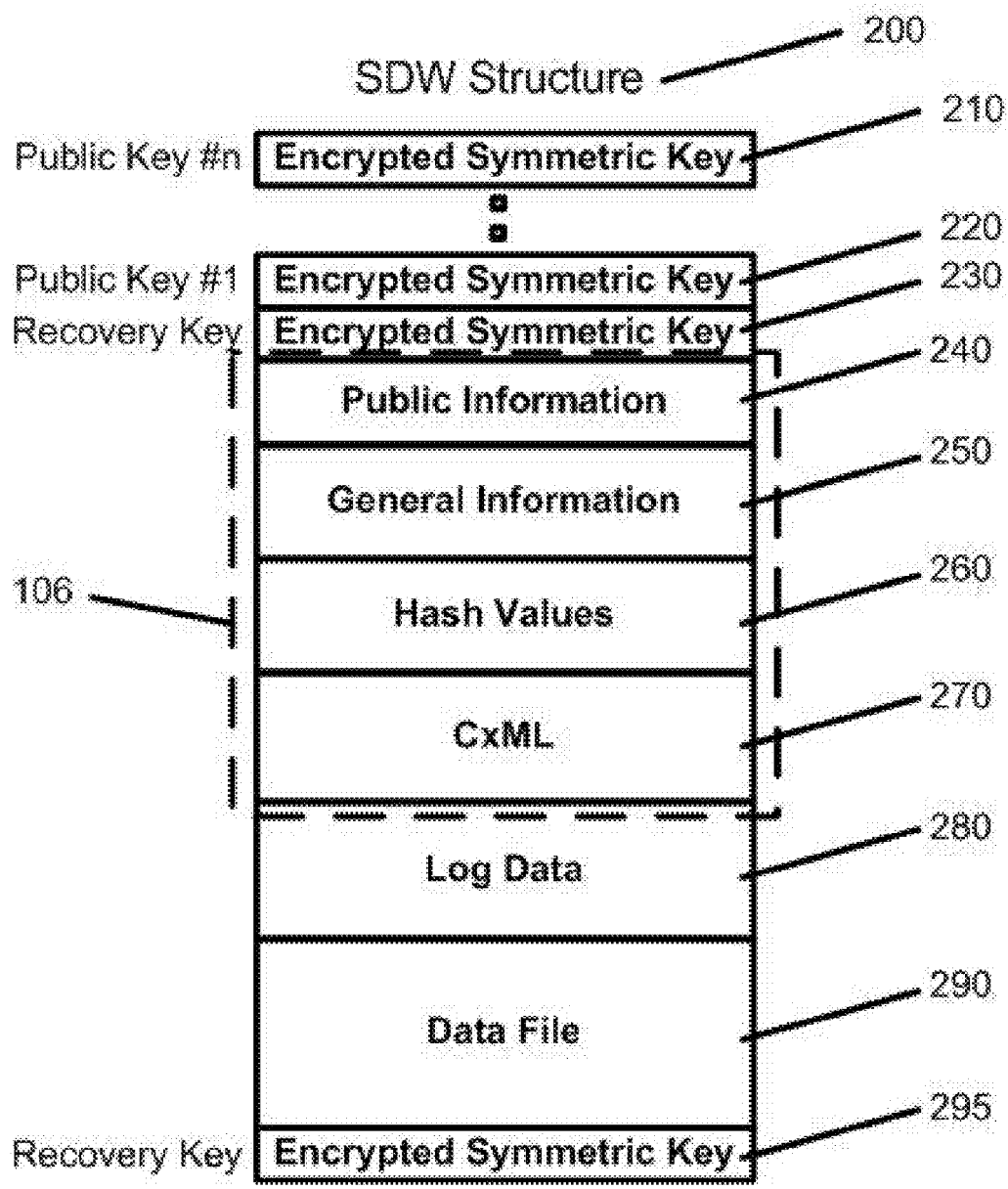
FIG. 2 is a schematic block diagram of an illustrative SDW according to some embodiments of the present invention.

FIG. 2 is a schematic block diagram of an illustrative SDW according to some embodiments of the present invention. An SDW 200 preferably encapsulates file 290, one or more keys (shown as keys 210-230 and 295 for the purpose of description only and without any intention of being limiting) and policy, as for example policy 106 of FIG. 1. Policy 106 preferably includes one or more hashes 260 for maintaining data integrity, a log 280 for recording any unauthorized actions (and optionally also of authorized actions) regarding file 290; and one or more CxML scripts 270. Recovery keys 230 and 295 optionally provide access to a file 290 that is encrypted and cannot be decrypted using its regular usage key (such as for example a private key (not shown)) because such a key is not available, for example when a user leaves the organization or when the private key is lost. The recovery key 230 or 295 is preferably generated when the regular private key is generated. Encrypted hash values (260) are preferably used for the whole SDW enclosure for preventing hacking or otherwise tampering with the file 290, for verification of the integrity of the CxML scripts 270 and for verifying that the data matches the CxML scripts 270. The SDW 200 also includes encrypted symmetric keys 210-220, encrypted using public keys located at the agents, which may optionally be of any suitable number but of which only two are shown for the purpose of illustration only, and general information (250), such as for example any information which may require encryption and also which is preferably provided to the agent (not shown).

In some cases several data files 290 may optionally be contained within a single SDW 200 (not shown), as for example in the case of certificate files that must accompany some data file, as may optionally be required for medical records for example. The mutual dependency is preferably built by using a hash value made on several files 290 and thus causing the verification process to require matching of the hash values in all files 290.

Optionally one or more of the necessary key(s) for decryption to access file 290 are not provided with the SDW 200 and/or file 290 itself, but instead are provided from a server (not shown) upon request for accessing file 290.

Figure 3:
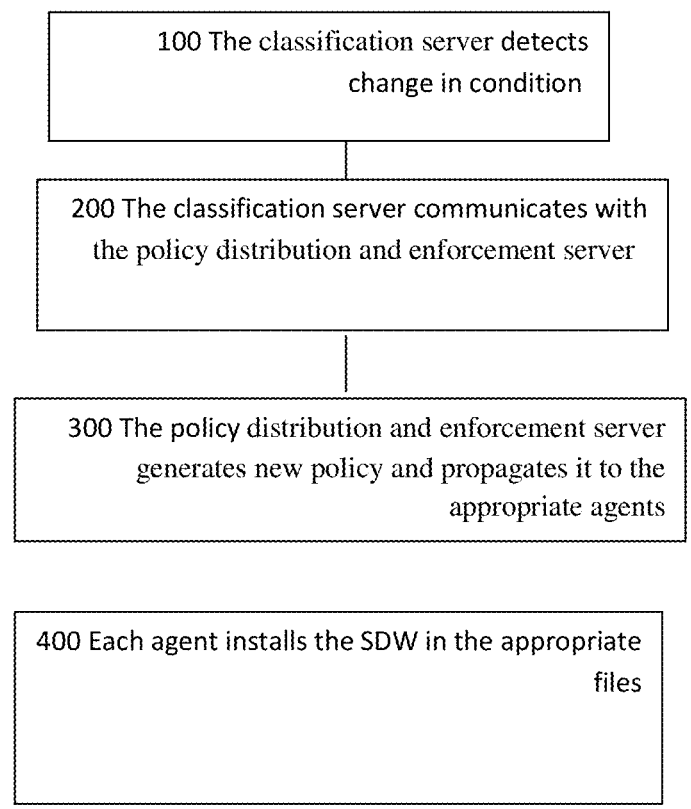
FIG. 3 is a flow diagram describing a scenario in which conditions that are affecting the file's policy are changed.

FIG. 3 is a flow diagram describing a scenario in which one or more conditions that may optionally affect the policy for a file are changed. First the classification server optionally and preferably detects change in a condition (100), for example with regard to a change in group, user, group and/or user permissions, restrictions on data, for example with regard to content (whether being made more or less restrictive). The change in condition is optionally detected according to an analysis of the logged interactions between the SDW and the agent. Then the information is preferably forwarded to the policy distribution and enforcement server (200). A new policy is preferably generated according to this information and is sent to the appropriate agent for application to the file (300). Next the new SDW is applied to the file by the agent (400).

Figure 4:
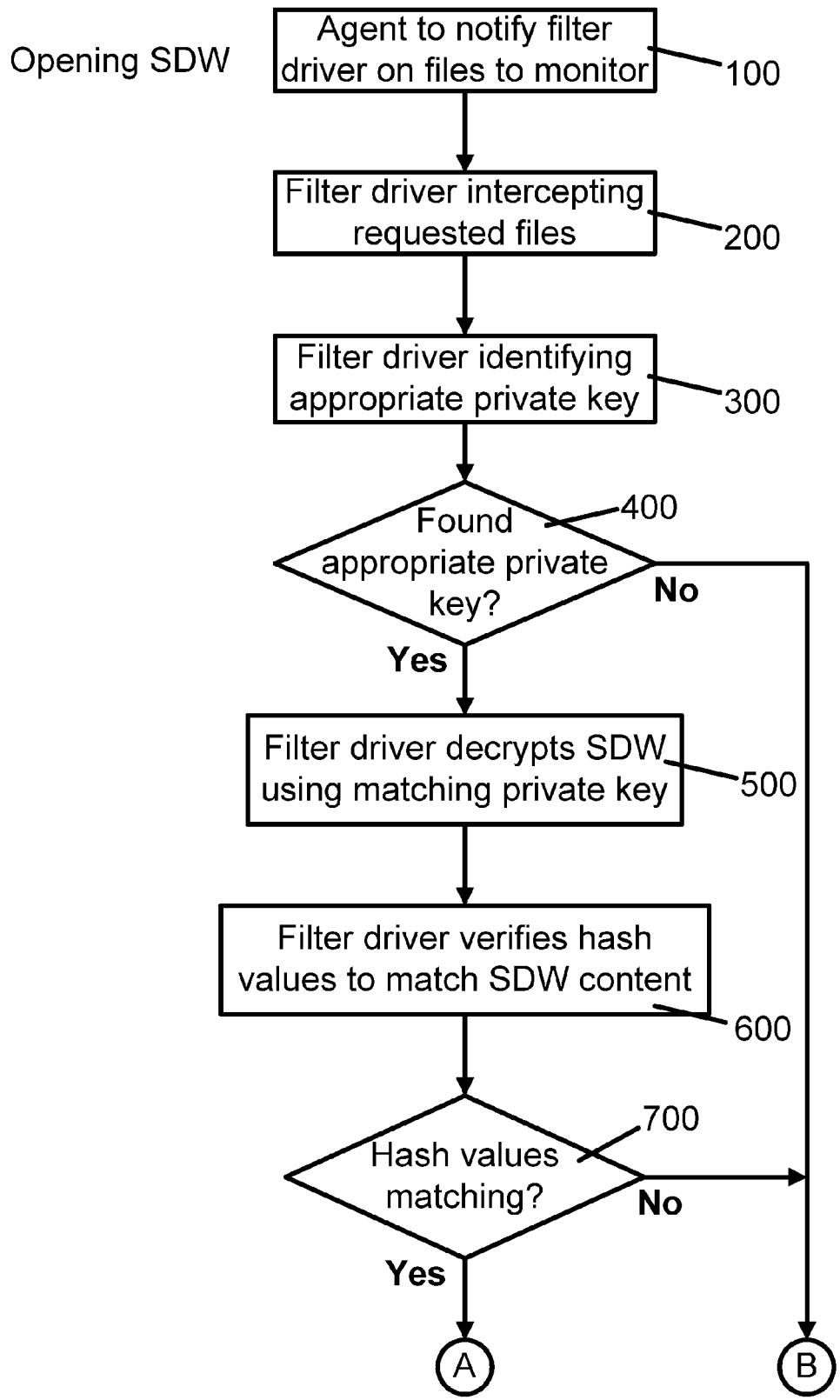
FIG. 4(1) and its continuation, FIG. 4(2) (connections between the two parts are shown with a letter "A" and a letter "B"), together are a flow diagram describing the interaction between the agent and the filter driver upon a user request for opening a file.

FIG. 4 is a flow diagram describing an exemplary illustrative implementation for interactions between the agent and the operating system, shown with regard to the interaction between the agent and a filter driver upon a request for opening a specific file for the purpose of description only and without any intention of being limiting. The term "filter driver" as used herein optionally relates to any mechanism for interactions between files and an operating system, for example with regard to the Microsoft Windows® operating system.

The request can optionally be a user initiated request or an application initiated request for example for AntiVirus/search operation-index of content. The agent preferably mediates between the file and the request initiating entity in order to enforce the Covertix policy on the file. The purpose of the process is to verify the authorization of the user with regard to this file before any action is taken on the file. Preferably and optionally the previously described policy rules are checked (as non-limiting examples only). More parameters can optionally be checked according to the policy and file type.

Turning to the drawing, first the agent preferably notifies the filter driver about the files to be monitored, according to instruction received from the policy distribution and enforcement method (100). Then the filter driver intercepts the requested file in order to enforce the policies on the file (200). Next the filter driver identifies the appropriate private key (300). The private key is preferably used for decrypting the symmetric key, which in turn is used to decrypt the management part of the SDW without decrypting the data part. Only the management part is more preferably decrypted in order to avoid unnecessary decryption of data section if not allowed, for example because the execution of the CxML script determines that file access and/or interactions are not allowed, and in order to keep the data protected.

If the symmetric key is found and decrypted (400) then the filter driver preferably decrypts the remainder of the SDW using matching symmetric key (500), then it verifies that the hash values matches the content of the SDW (600). If there is a match (700) then the filter driver preferably passes the CxML, log and general information section to the agent (800). Agent then executes the CxML and operates according to the instruction received (900). If file has open authorization (902), according to the information received from the filter driver, then the agent preferably sets the rules for monitoring and enforcing the file according to CxML instructions (904). The agent then preferably logs the operation of opening the file (906) and notifies the file driver of approval of the file operation (908).

Alternatively, if the authorization fails, then in stage 910 the agent is notified of such failure; the failed action is preferably logged (912) and the agent optionally and more preferably notifies the user of the failure to access the file (914).

Figure 5:
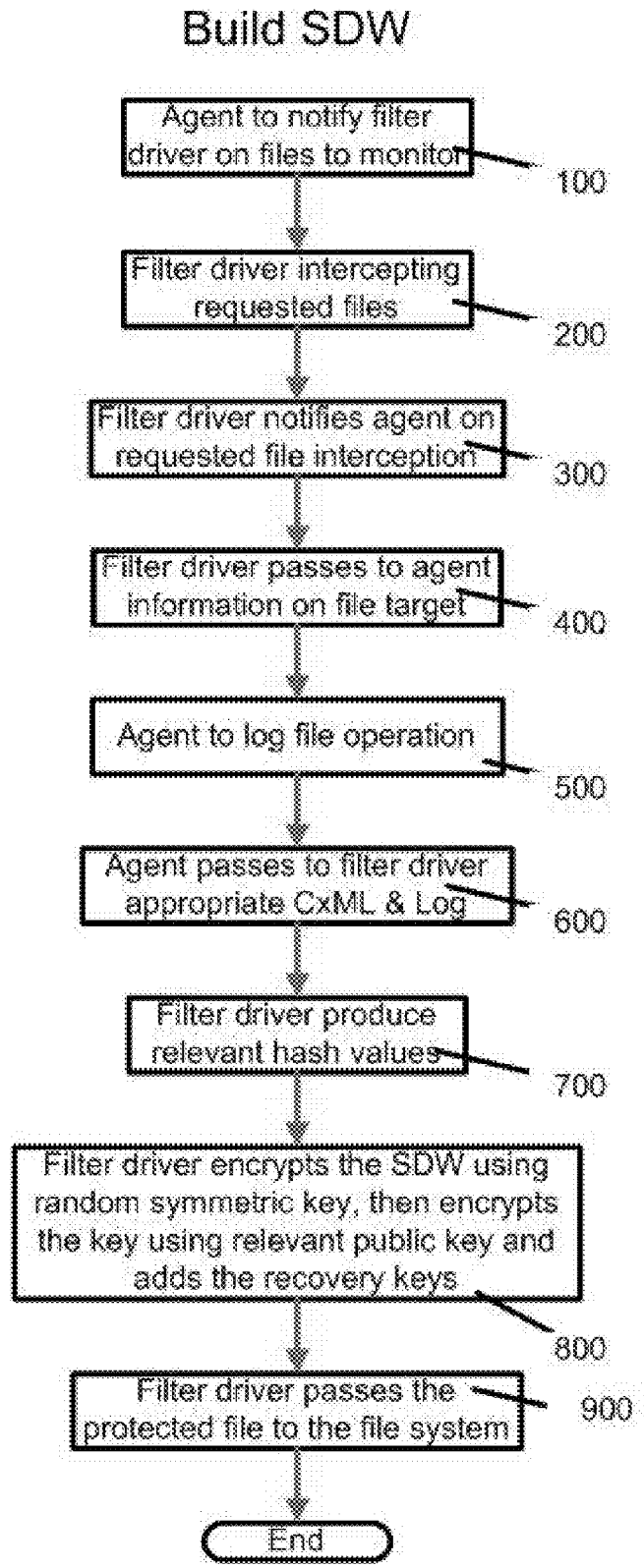
FIG. 5 is a flow diagram describing the process of building an SDW.

FIG. 5 is a flow diagram describing an exemplary, illustrative implementation of the process of building an SDW when a new file is created. This process optionally and preferably enforces the policy on the new file by attaching an encrypted SDW to the file. As shown, the agent notifies the filter driver about the new file (100) to monitor, and then the filter driver intercepts the requested files, for optionally performing one or more actions on the file (200).

Next the filter driver notifies the agent of the interception, so the agent can enforce policies on the file (300). The filter driver passes to agent information on the desired file (400) so that the agent may properly identify the specific file.

The agent then preferably starts the process of logging operations taken on or with regard to the file, in order to enable the auditing of actions taken on the file (500). The agent preferably passes the appropriate CxML and log information to the filter driver for building the SDW (600). Next the filter driver produces relevant hash values for the SDW (700).

The filter driver then preferably encrypts the SDW, using random symmetric key and then encrypts the key itself, using relevant public key and the recovery keys (800). Various components of the SDW are optionally encrypted separately to permit separate decryption. The filter driver then preferably passes the protected file to the file system (900).

Figure 6:
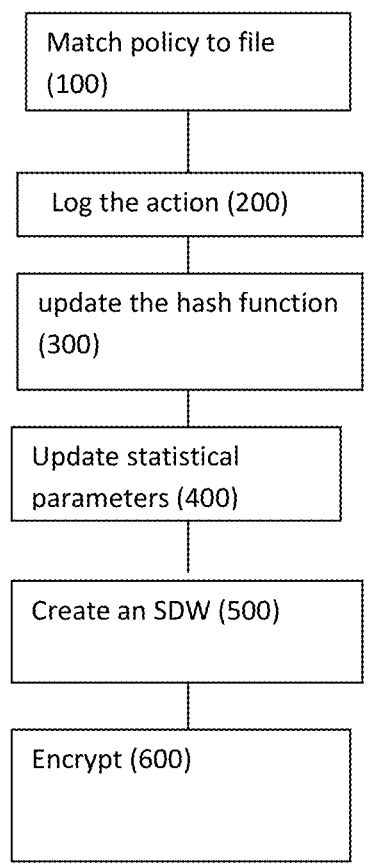
FIG. 6 is a flow diagram describing the actions taken by the system when a file is saved.

FIG. 6 is a flow diagram describing the actions taken by the system when a file is saved. Saving a file preferably entails the updating of statistics and log information regarding the file usage, and more preferably also verifying that the user is entitled to save the changes according to the file's policy. As shown, the agent preferably matches policy to the file while taking into account policy conflict resolution rules (100). Then the agent optionally logs the action and if possible sends a log message to the log server (200). Next the agent preferably updates the hash values to reflect any change (300). The agent then optionally and preferably updates the statistical parameters such as file usage time etc (400). Next the agent preferably creates an appropriate SDW that optionally and more preferably includes the updated data file, policy and hash values (500). The agent then preferably encrypts the updated data using the user public key (600).

Figure 7:
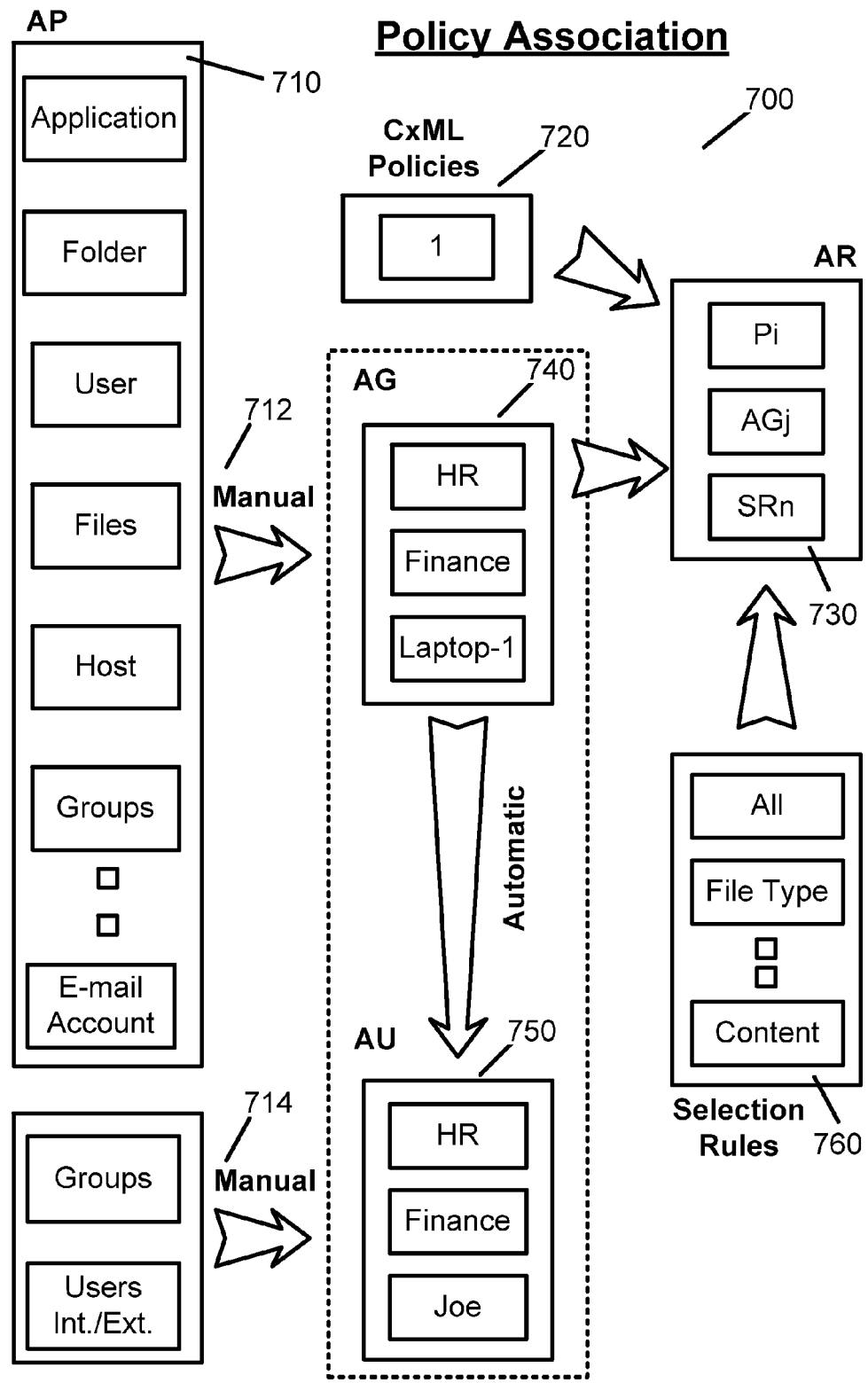
FIG. 7 is a diagram describing the policy association process.

FIG. 7 is a diagram describing the policy association for attaching policy to a data object (file). Policy association is used by the policy builder in order to associate one or more policy rules with one or more parameters regarding the file, including but not limited to file content, conditions such as the user that is currently using the file, the computer on which the file is currently located, other relevant file parameters such as status parameters, including but not limited to expiration date and/or dates according to which one or more actions are restricted, or any other parameters in time, etc. The output of the policy association process is then preferably transferred to the agents.

Turning now to the drawing, FIG. 7 shows the flow and components for policy association 700. As shown AP or Association Points (710) are preferably a list of all the available logical/physical/geographical places in which a file may reside. From this list the administrator selects locations on which the policy is to be applied, preferably in a manual process 712.

AG or Associated Group (740) is preferably a collection of locations as selected from the AP (710) that forms a logical group which is relevant for a specific data object, such as a specific file for example. AU or Associated Users (750) is preferably a list of users/groups that can access the data object specified by the AG (740). Some of these users/groups are automatically added to the AU (750) as a result of being defined on a specific shared folder for example and/or according to other policy requirements. Other users/groups may be added/deleted to the AU (750) by the administrator, according to the relevant business rules, preferably in a manual process (714). The manual process (714) optionally enables the administrator to manually add, change and/or delete users or groups that were automatically added to the AU (750).

AU (750) defines the users that are able to access the object data. The AU (750) preferably does not cause or induce a bypass of other file access permissions which may optionally be defined through a policy and/or through third party software systems (such as operating system permissions for example), and therefore a user that does not have access to a shared folder, and is part of the AU list (750) either does not gain access to the file or get an access by a third party only. An AU (750) is preferably always connected to a specific AG (740).

AR or Association Rules (730) is a collection of predefined rules that an administrator optionally uses when associating a policy with an AG (740). These rules are preferably used when there is a need to perform a more precise policy association. AR (730) is optionally and preferably built using one or more selection rules (760).

AR (730) optionally and preferably includes, for example, an association of one or more specific file type/s with an AG (740) and a policy. For example, such an association may optionally include associating all the *.doc file types in a specific folder with a specific policy, and/or associating specific content with an AG (740) and a policy, for example as determined according to a specific dictionary on a specific host.

CxML Policy (720) is optionally a predefined policy as for example "do not allow printing", but may also optionally be adjusted according to AG (740) as for example "do not allow printing to group HR (human resources)". A predefined CxML (720) policy is preferably already located in the CxML database (not shown) whereas a custom built CxML is optionally and preferably manually configured with the creation of the AR (730). A custom built CxML policy can optionally extend a predefined CxML policy.

The above process may optionally be performed with a policy that is not implemented according to the present invention, for example with any type of policy and/or set of one or more rules.

Figure 8:
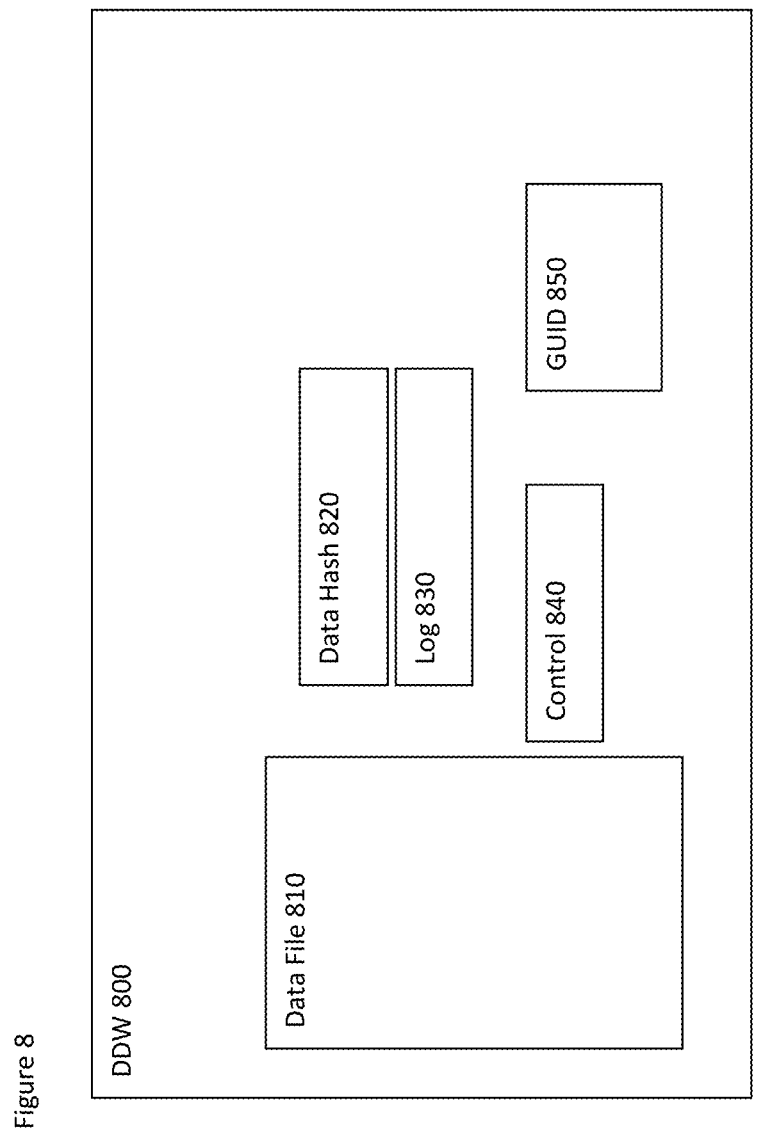
FIG. 8 is a schematic diagram of a data discovery wrapper.

FIG. 8 is a schematic drawing of the data discovery wrapper (DDW). The DDW (800) is optionally used in the information movement discovery phase, which as previously described may optionally be performed before actual policies are enforced. This phase is optionally used for analyzing the movement of the data inside and outside of the organization in order to enforce policy in the later stage. The purpose of this phase is optionally to provide a clear view of data movement inside the organization, to understand what security breaches may occur as a result of this data movement and to gradually enforce security policies inside the organization. At this stage, policy and encryption are preferably not enforced yet.

As shown DDW (800) preferably features at least some of the same or similar elements as for the previously described SDW, including but not limited to, the data file (810) on which the monitoring is requested, data hash element (820) used for security reasons as to protect against altering of a policy to a specific data file, and a log element (830) which holds all operations done on the file. DDW (800) also optionally includes a control element (840) which contains control attributes for the agent and GUID (850) which is a unique key created for each file and stays with it throughout its lifecycle.

The log element (830) optionally and preferably holds the information in relation to actions that were done on the enclosed data file, either inside or outside the organization, more preferably regardless if the file is connected to the logging server when the action takes place. This element optionally resides on the SDW as well. The data log elements optionally and preferably feature one or more of the following the fields: GUID, user credential data and time, one or more actions such as Print, Save, Copy/Paste, E-mail, one or more actions such as Print, Save, Copy/Paste, E-mail, From user/To user, Host information such as CPU, MAC, Network, etc and policy ID.

Optionally DDW (800) may include one or more other components of the SDW, such as for example a script in CxML.

Figure 9:
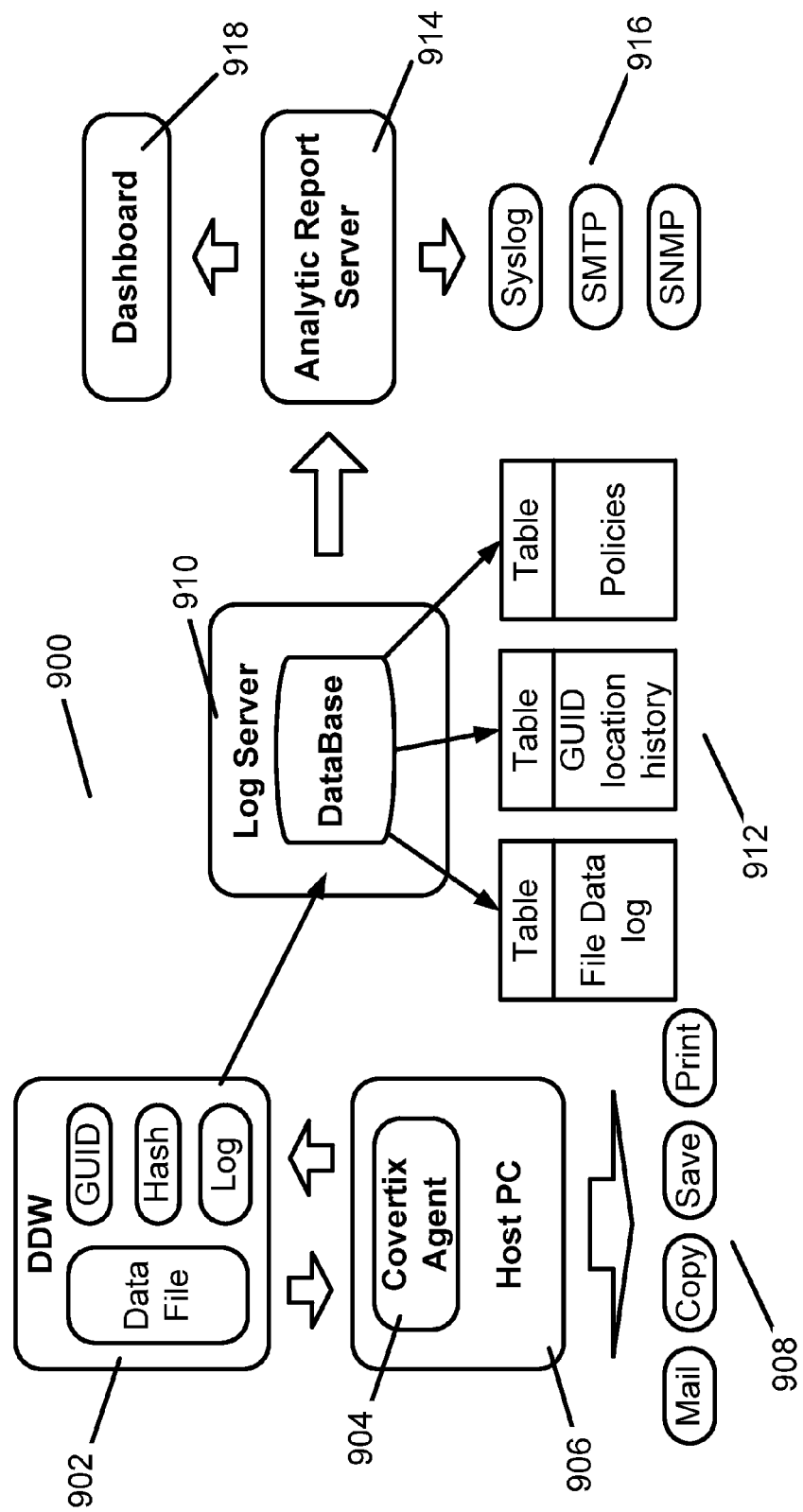
FIG. 9 is a diagram describing the policy inspection process.

FIG. 9 is a diagram describing the policy inspection process, which optionally and preferably follows the data discovery process. During this process, optionally notifications are sent to users as to actions that are violating company security regulations. Another important functionality is for identifying possible policy conflicts. To help ease this problem, the policy inspection phase also collects information on policy change decisions made throughout the usage of inspected data files. This information greatly improves the visibility of the administrator on the policy conflicts that arise in his organization, and thus help in making better decisions when setting the policy conflict resolution parameters.

As shown, a system (900) preferably includes a DDW (902) which interacts with an agent (904) installed on a user computer (906). Optionally system (900) could be implemented with the SDW as previously described, additionally or alternatively to implementation with DDW (902). User computer (906) preferably performs one or more actions (908) on the content of DDW (902), specifically with regard to the file contained therein (not shown), for example optionally including but not limited to one or more of email, altering the file, copying the file, printing and the like.

DDW (902) preferably then (directly or alternatively indirectly through agent (904)) sends log information to a log and audit server (910), with regard to the one or more actions (908) and/or any other interactions with the file. Log and audit server (910) optionally and preferably stores this information in a database (912).

Log and audit server (910) also preferably sends such logged information to an analytic report server (914), for example for auditing, analyses and/or issuing one or more reports, whether stored in a database 916 or displayed to a user, such as an administrator, through a display (918).

At this phase the log & audit server is introducing the policies table. This table consists of all built in and custom created policies. The analytic report server optionally receives as input all the data collected from various files and, using a logic simulation, enforces requested policies on the collected data. The result is a list of violations that the can be analyzed in order to understand what would have happened if this policy was activated.

Figure 10:
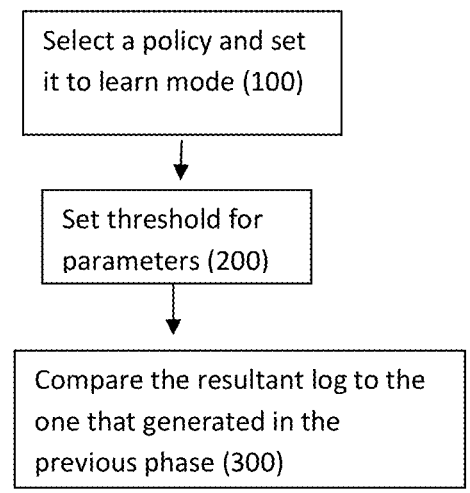
FIG. 10 is a flow chart describing the policy learning phase.

FIG. 10 is a flow chart describing the policy learning phase as a method. As shown, first a policy is selected, for example based on the above policy inspection process, and is preferably set to learn mode (100). Next thresholds are preferably assigned for a variety of parameters which are recorded or otherwise noted if the threshold is met (200). Such statistics optionally include but are not limited to:

a. More/less than certain % of files from specific folder were sent by e-mail
    b. More/less than certain % of files from specific folder were moved to another folder
    c. More/less than certain % of files from specific folder were sent by e-mail
    d. More/less than certain % of files from specific folder were sent outside of the organization
    e. File type % was exceeded on a specific folder
    f. More/less than certain % of files from specific folder with specific keywords were found The resultant log of information is preferably compared to the log that was generated by the previous phase (300). This analyzed information optionally is used for determining the actual active policy to be applied to the file, and to avoid conflicts.

Figure 11:
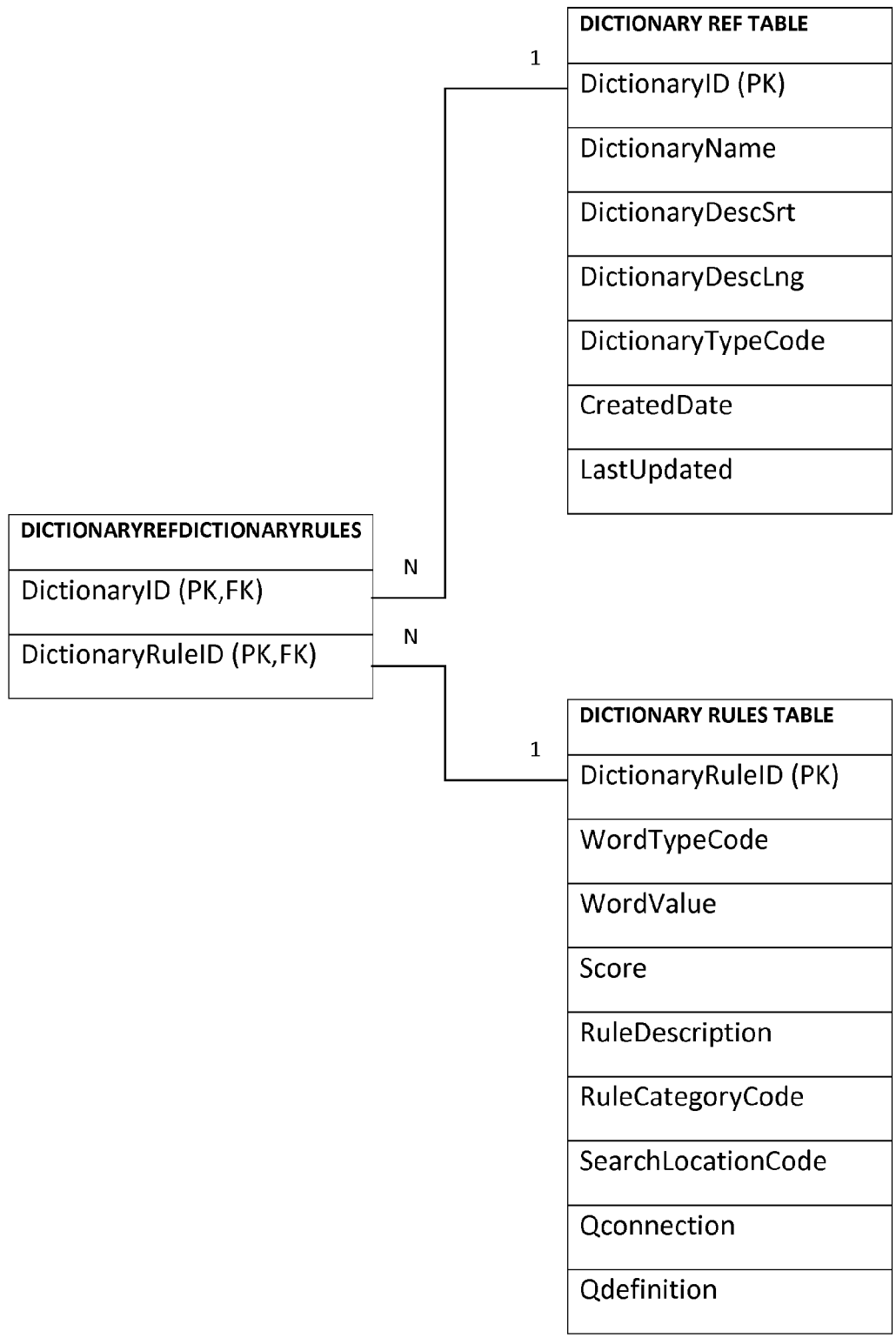
FIG. 11 is a diagram describing the structure of a risk score table.

FIG. 11 is a diagram describing the structure of a risk score table for embodiments of the present invention providing risk score information at different levels and across different dimensions. The risk factors themselves may optionally be any such factors as described herein. A risk score is optionally calculated for a data file regardless of its policy. In order to assign risk factors, dictionaries are optionally and preferably defined, which may also optionally be the same or similar dictionaries that can be used to associate a policy to a given data object. The score calculation is optionally based on comparing all dictionary rules for selected dictionaries against the file's content. For example the method can optionally add the score of a rule the matches the file content to the total score. For example, for a file containing social security numbers: if Rule 1: Regex—###-##-#### equals 3 points (ie each social security number would receive 3 points)
Rule 2: Text: "Confidential Information" equals 5 points
And the following file content is:
Customer List File (Confidential Information):

| SSN | Name |
| --- | --- |
| 123-45-6789 | Joe |
| 123-45-6790 | Ron |

Then the total score is 11. The diagram shows various structures for such rules.

The file risk factor can optionally be aggregated across repositories such as file directories, SharePoint directories, file management applications, computers, file servers, user and or user group access etc.

Figure 12:
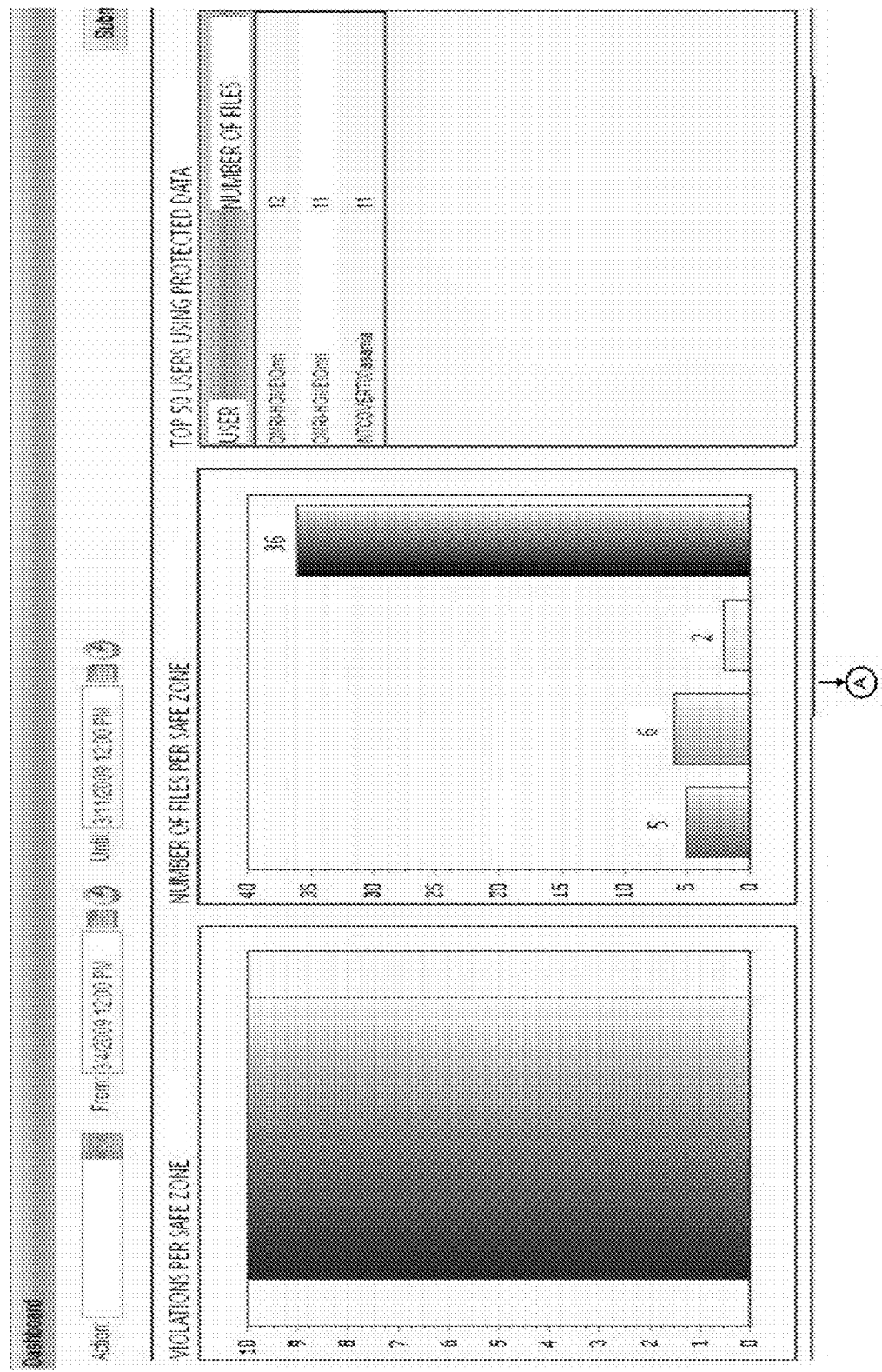
FIG. 12(1) and its continuation, FIG. 12(2) (connections between the two parts are shown with a letter "A"), together are an exemplary sample screen shot for software according to the present invention.

FIG. 12 is an exemplary screenshot of a report according to the present invention, with regard to analysis of logged data as described with regard to FIG. 1. The report summarizes the data exposure of a particular department, in this case the human resources department, and is an example of the types of analyses and reports contemplated by the present invention.

Figure 13:
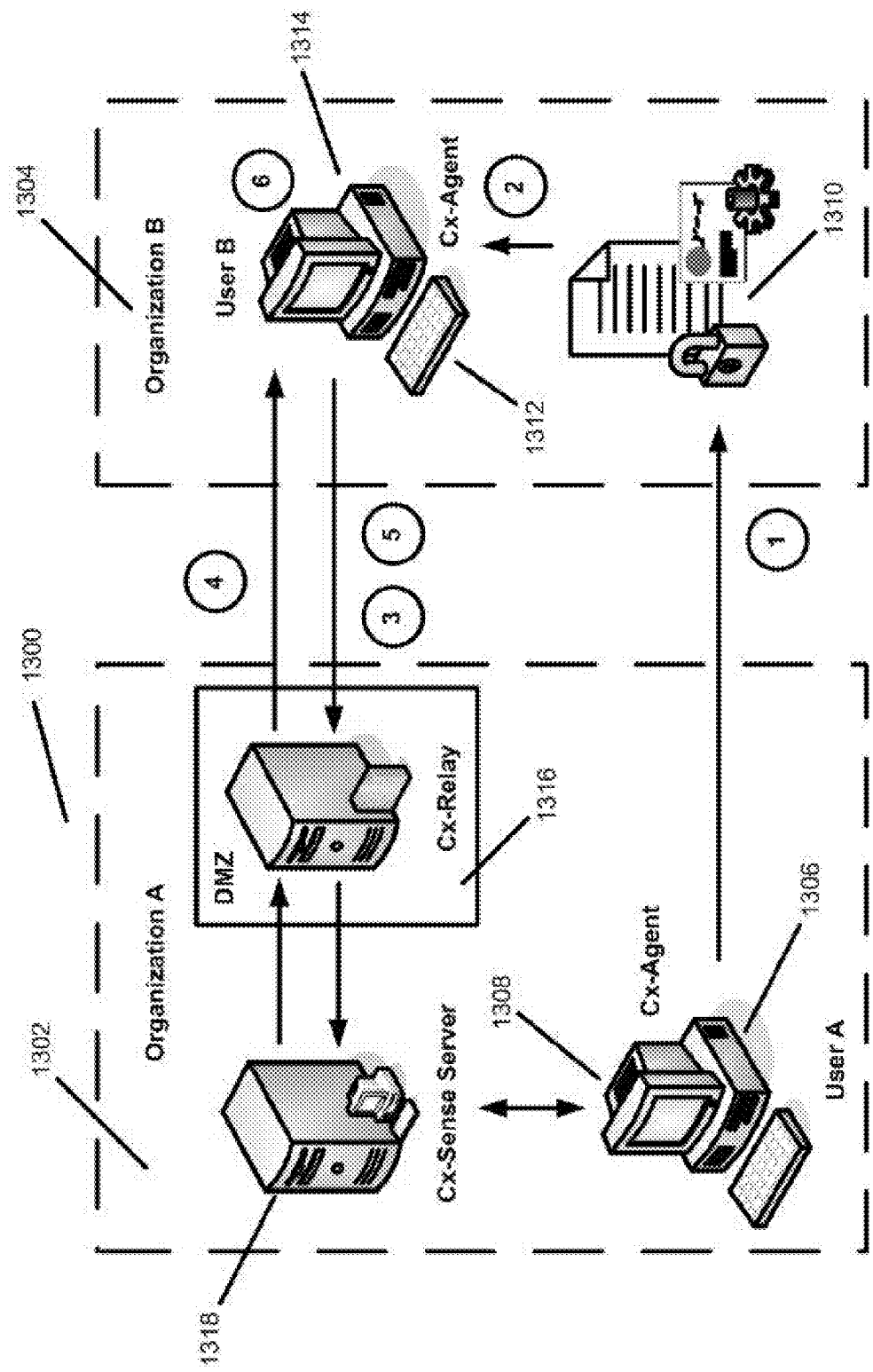
FIG. 13 shows an exemplary flow diagram of a process for controlling and/or managing a file which leaves the physical and/or electronic boundaries of an organization.

FIG. 13 shows an exemplary flow diagram of a process for controlling and/or managing a file which leaves the physical and/or electronic boundaries of an organization. As shown, a system (1300) features an organization A (1302) and an area outside of the organization (physically and/or electronically), shown as organization B (1304) (although this location may optionally not be any type of organization). User A computer (1306) in organization A (1302), featuring an agent (1308), sends a protected file (1310) to a user B computer (1312) in organization B (1304). If user B computer (1312) does not feature an agent according to the present invention, then preferably the data of file (1310) cannot be decrypted and opened or otherwise accessed or interacted with.

If user B computer (1312) does feature an agent (1314) as shown, then agent (1314) detects the presence of at least a policy and more preferably an SDW as previously described for file (1310). Agent (1314) then optionally and preferably contacts a server (1316) within the DMZ (demilitarized zone), which relays the request for information to a policy server (1318), according to the requirements of the policy. Policy server (1318), preferably through DMZ server (1316), then relays validation information to agent (1314). Agent (1314) then preferably enforces the policy set by organization A (1302), for example through policy server (1318), and preferably also sends any log information to policy server (1318).

Figure 14:
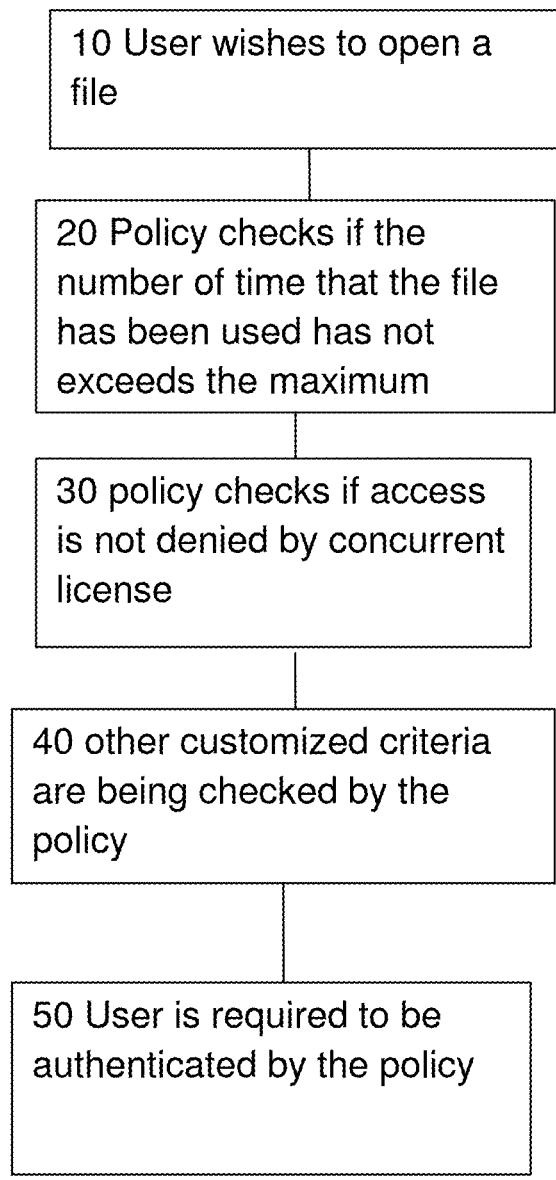
FIG. 14 is a diagram showing an exemplary scenario of opening a file.

FIG. 14 is a diagram showing an exemplary scenario of opening a file. It should be noted that this diagram is presented for the purpose of description only and without any intention of being limiting. When the user wishes to open a file (10) the policy checks if the number of times that the file has been opened has not exceeded the maximum. For example if the file is allowed to be opened five times, and it has already been opened five times, the file will not be opened (20). This is optionally and preferably implemented by a rule in the policy and a counter, which is updated upon each opening of a file. Then, if the file is allowed to be opened according to the previous criteria, the policy checks if the access is not denied by a concurrent license which is applied to this file (30). The policy can optionally and preferably manage the concurrent license of the file by controlling the number of concurrent accesses to the file, using for example a counter which is embedded in the policy. Then, if the file is allowed to be opened according to the previous criteria, other fields that have been customized by the operator of the enterprise that is using this policy are being checked. For example the policy can optionally check if a certain event, such as, for example, disclosure of specific information has already occurred (40). This is preferably implemented by imposing the policy rules on the file. Then the user is authenticated by the policy by for example entering his user name password and one more private detail (50). The data that is entered by the user is optionally and preferably authenticated by the policy without using an external server.

While the invention has been described with respect to a limited number of embodiments, it will be appreciated that many variations, modifications and other applications of the invention may be made.

What is claimed is:

1. A system for automatically enforcing security policies on an electronic file regardless of its physical or electronic location for an organization, comprising:
a plurality of files, each file containing a data object and a policy for enforcing rules on one or more operations on the data object, whereby a plurality of policies are provided, wherein said policy is attached to each of said files;
a plurality of agents responsible for enforcing the policies and for independently determining whether an enforcement action is necessary according to the policy attached to each of said files, each agent being installed on a computational device and featuring at least one application component;
a policy builder console being responsible for generating the said policies; and
a policy distribution server for distributing the policies to the files;
wherein the policy builder console is operable to change one of the policies after it has been applied to one of the files, the policy distribution server is operable to distribute the changed policy to said one of the files, and the agents are operable to apply said changed policy to said one of the files in place of the policy previously applied to said one of the files, thereby providing dynamic policies;
further comprising a secure data wrapper (SDW) for securing said file, wherein said SDW comprises said policy and wherein said SDW prevents an unauthorized operation on said file; and a key management server for distributing encryption/decryption keys to said agent;

wherein said encryption keys are used to encrypt and decrypt said SDW and said policy by said agent;

wherein said policy comprises limiting the access and usage based on one or more system attributes, wherein the said policy limits the access and usage of the file based on an environment in which said particular file is located, wherein said environment is determined according to a physical and/or electronic boundary of the organization.

2. The system of claim 1, wherein each agent monitors operations performed on each file, the system further comprising:

a logging and auditing server for collecting data from all the said agents into a repository.

3. The system of claim 2, wherein data regarding said operations performed on each file is reported by said logging and auditing server.

4. The system of claim 3, wherein an overall level of risk is determined for said operations.

5. The system of claim 1, further comprising:

a classification server for classifying the content of files.

6. The system of claim 1, wherein at least one file is inaccessible by said computational device if said agent is not present on said computational device.

7. The system of claim 1 wherein said policy determines a number of times that a particular file can be accessed.

8. The system of claim 7 wherein said policy comprises managing a concurrent license for said particular file.

9. The system of claim 8 wherein said policy comprises customization to reflect the special requirements of the organization to which said particular file belongs.

10. The system of claim 9 wherein said policy comprises multifactor authentication within said particular file.

11. The system of claim 1 wherein said policy can automatically remove protection of a file of said plurality of files after a predefined period.

12. A method for automatically enforcing a security policy on an electronic file regardless of its physical or electronic location for an organization, the file comprising a data object, the policy enforcing rules on one or more operations on the data object, the method comprising:

providing a plurality of agents, each agent being installed on a computational device, each agent featuring at least one application component, each agent being responsible for enforcing said policy and for independently determining whether an enforcement action is necessary;

generating a plurality of different policies for different files by a policy builder, wherein at least one policy is a default policy for maintaining at least a baseline type of policy implementation for an organization and wherein at least one policy is a non-default policy;

if available, automatically assigning said non-default policy to the file, without the awareness and the intervention of user, by wrapping the file in a secure data wrapper (SDW) and attaching said non-default policy to the file through said SDW, wherein said wrapping the file in said SDW comprises encrypting said SDW and said non-default policy;

otherwise applying said default policy to the file, by wrapping the file in said SDW and attaching said default policy to the file through said SDW, wherein said wrapping the file in said SDW comprises encrypting said SDW and said default policy;

changing said non-default policy or said default policy to form a changed non-default policy or a changed default policy;

applying said changed non-default policy or said changed default policy to the file by said agent in place of the policy previously applied to the file, thereby providing dynamic policies;

decrypting said non-default policy or said default policy with said encryption keys;

determining whether an operation on the data object is permitted according to said policy, wherein said policy limits the access and usage based on one or more system attributes, wherein said policy limits the access and usage of the file based on an environment in which said particular file is located, wherein said environment is determined according to a physical and/or electronic boundary of the organization; and if an operation on the data object is permitted according to said policy, decrypting said SDW with said decryption keys.

13. The method of claim 12, wherein said non-default policy is selected for a file according to one or more of content analysis, file attribute, group classification, status parameter, access control, location control, email recipient/sender, application file creator or user.

14. The system of claim 1, wherein for a particular file, said agent requests a changed policy from said policy distribution server upon an occurrence of one or more of a change in time, a change in file environment or a change in an external condition to said file, and wherein said agent determines said occurrence of said one or more changes according to said policy of said file.

15. The method of claim 12, wherein said operation comprises a user operation, wherein decrypting said SDW is performed only if said policy grants permission for said user operation, further comprising performing said user operation on said file.

16. A system for automatically enforcing security policies on an electronic file regardless of its physical or electronic location for an organization, comprising:

a plurality of files, each file containing a data object and a policy for enforcing rules on one or more operations on the data object, whereby a plurality of policies are provided;

a plurality of agents responsible for enforcing the policies and for independently determining whether an enforcement action is necessary according to the policy attached to each of said files, each agent being installed on a computational device and featuring at least one application component;

a policy builder console being responsible for generating the said policies; and a policy distribution server for distributing the policies to the files;

wherein the policy builder console is operable to change one of the policies after it has been applied to one of the files, the policy distribution server is operable to distribute the changed policy to said one of the files, and the agents are operable to apply said changed policy to said one of the files in place of the policy previously applied to said one of the files, thereby providing dynamic policies;

further comprising a key management server for distributing encryption/decryption keys to said agent; and a secure data wrapper (SDW) for securing said file, wherein said SDW comprises said policy and said file; wherein said plurality of agents are responsible for enforcing said policy and for independently determining whether an enforcement action is necessary according to said policy included in said SDW, and wherein said encryption keys are used to encrypt and decrypt said SDW and said policy by said agent;

wherein said policy comprises limiting the access and usage based on one or more system attributes, wherein the said policy limits the access and usage of the file based on an environment in which said particular file is located, wherein said environment is determined according to a physical and/or electronic boundary of the organization.

* * * * *